(12) United States Patent
Das et al.

(10) Patent No.: US 12,277,120 B2
(45) Date of Patent: Apr. 15, 2025

(54) SYSTEM FOR CREATING AND ACCESSING DIGITAL CARDS STORED IN DECENTRALIZED CONTENT STORAGE

(71) Applicant: Microsoft Technology Licensing, LLC, Redmond, WA (US)

(72) Inventors: Salil Das, Seattle, WA (US); Cezar Augusto Alevatto Guimaraes Neto, Boca Raton, FL (US); Peter Loren Engrav, Seattle, WA (US); Brian Scott Krabach, Everett, WA (US); Deniz Cakirkaya, Seattle, WA (US); Brian Charles Blomquist, Lynnwood, WA (US); Craig Thomas Targosz, Seattle, WA (US); Sarojini Garapati, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 17/839,003

(22) Filed: Jun. 13, 2022

(65) Prior Publication Data
US 2023/0401212 A1    Dec. 14, 2023

(51) Int. Cl.
*G06F 16/182* (2019.01)
*G06F 16/2455* (2019.01)

(52) U.S. Cl.
CPC ........ *G06F 16/2455* (2019.01); *G06F 16/182* (2019.01)

(58) Field of Classification Search
CPC ........................... G06F 16/182; G06F 16/2455
USPC ....................................................... 707/769
See application file for complete search history.

(56) References Cited

U.S. PATENT DOCUMENTS

| | | | |
|---|---|---|---|
| 5,600,827 A | 2/1997 | Nakabayashi | |
| 8,838,485 B2* | 9/2014 | Kiarostami | G06Q 30/0641 705/26.1 |
| 11,552,799 B1* | 1/2023 | Parikh | G06F 16/2365 |
| 2005/0033719 A1 | 2/2005 | Tirpak et al. | |
| 2007/0113271 A1* | 5/2007 | Pleunis | G11B 19/02 |
| 2008/0313119 A1 | 12/2008 | Leskovec et al. | |
| 2010/0076962 A1* | 3/2010 | Doyle | G06F 16/00 707/769 |
| 2010/0306247 A1* | 12/2010 | Sidman | H04L 63/123 707/769 |
| 2012/0147055 A1* | 6/2012 | Pallakoff | G06F 3/0483 345/672 |
| 2013/0290256 A1 | 10/2013 | Barrall et al. | |
| 2017/0038935 A1 | 2/2017 | Matsushima | |
| 2017/0169065 A1* | 6/2017 | Darcy | G06F 3/0481 |

(Continued)

OTHER PUBLICATIONS

"International Search Report and Written Opinion Issued in PCT Application No. PCT/US23/019051", Mailed Date: Jul. 10, 2023, 11 Pages.

(Continued)

*Primary Examiner* — Hanh B Thai
(74) *Attorney, Agent, or Firm* — RAY QUINNEY & NEBEKER P.C.; Paul N. Taylor

(57) ABSTRACT

A reference to a digital item is stored as a digital card. The digital card can also be contained in, and/or refer to, other digital cards. The digital card can also include properties or attributes that may be added from the digital item that is being referred to. The digital card can be stored in a data pod within a de-centralized data storage system architecture.

17 Claims, 23 Drawing Sheets

(56) References Cited

U.S. PATENT DOCUMENTS

| | | | |
|---|---|---|---|
| 2019/0188411 A1* | 6/2019 | Kroutik | H04L 9/3297 |
| 2019/0303509 A1 | 10/2019 | Greene | |
| 2019/0303893 A1* | 10/2019 | Ramasamy | G06K 7/10366 |
| 2019/0369979 A1* | 12/2019 | Woods | G06F 16/137 |
| 2019/0386969 A1* | 12/2019 | Verzun | G06F 21/606 |
| 2020/0117818 A1* | 4/2020 | Latka | H04L 67/1097 |
| 2020/0134064 A1 | 4/2020 | Guha et al. | |
| 2020/0143015 A1* | 5/2020 | LeBeau | G06Q 20/065 |
| 2020/0143367 A1* | 5/2020 | LeBeau | G06F 21/64 |
| 2020/0233878 A1 | 7/2020 | Huang et al. | |
| 2020/0250217 A1 | 8/2020 | Abhyankar | |
| 2021/0174911 A1* | 6/2021 | Sharda | G06Q 10/103 |
| 2021/0312078 A1* | 10/2021 | Jayachandran | H04L 63/123 |
| 2021/0326223 A1* | 10/2021 | Grunwald | G06F 9/44505 |
| 2021/0397653 A1 | 12/2021 | Russell et al. | |
| 2022/0358241 A1* | 11/2022 | Palakodety | G16H 15/00 |
| 2023/0088936 A1* | 3/2023 | Chalkley | H04L 9/3213 |
| | | | 705/26.81 |
| 2023/0306547 A1* | 9/2023 | Patel | G06Q 50/265 |
| 2023/0316261 A1* | 10/2023 | Agbamu | G06N 3/09 |
| | | | 705/67 |
| 2023/0401178 A1 | 12/2023 | Das | |
| 2024/0086467 A1 | 3/2024 | Sirkin | |

OTHER PUBLICATIONS

"International Search Report and Written Opinion Issued in PCT Application No. PCT/US23/019052", Mailed Date: Aug. 4, 2023, 11 Pages.

Non-Final Office Action mailed on Jan. 4, 2024, in U.S. Appl. No. 17/839,012, 18 pages.

Non-Final Office Action mailed on Nov. 21, 2023, in U.S. Appl. No. 17/943,760, 42 pages.

Final Office Action mailed on Apr. 16, 2024, in U.S. Appl. No. 17/943,760, 40 Pages.

Notice of Allowance mailed on May 29, 2024, in U.S. Appl. No. 17/839,012, 08 pages.

Notice of Allowance mailed on Aug. 7, 2024, in U.S. Appl. No. 17/943,760, 13 pages.

Notice of Allowance mailed on Sep. 23, 2024, in U.S. Appl. No. 17/839,012, 08 pages.

* cited by examiner

| Recently opened | | | Filtered by keyword | ☰ Filter ⌄ |
|---|---|---|---|---|
| | Name | Opened ▶ | Owner | Activity |
| Chat | Metafolder Design Release | 2h ago | Gabe | 📱 You shared this in a teams chat |
| Doc. | MetaFolder – Everything is a card | 6h ago | Lyla | 👤 Gabe shared this with you<br>User |
| Present-ation | MetaFolder – Initial Design | 3 days ago | Mary | 👤 Nicole replied to comment<br>User |
| | ... | | | |

| Recently opened | | Filtered by keyword | |
|---|---|---|---|
| | | | ☰ Filter ∨ |
| Name | Modified ▼ | Owner | Activity |
| Chat — Metafolder Design Release | 2h ago | Gabe | 🖥️👤 You shared this in a teams chat |
| Presentation — Name | 6h ago | Mary | 👤 User — Gabe shared this with you |
| Doc. — Name | Yesterday at 6:29 pm | Magdalena | 👤 User — Nicole replied to comment |
| ... | | | |

FIG. 16

| Browse by meetings | | Filtered by keyword | ☰ Filter ⌄ |
|---|---|---|---|
| Name | Start time ▶ | | |
| Metafolder Design Release | Fri at 2:35 | | |
| Kick-Off | Wed at 3:00 PM | | |
| Gabe & Alyx Chat | Feb 24 | | |
| ... | | | |

SYSTEM FOR CREATING AND ACCESSING DIGITAL CARDS STORED IN DECENTRALIZED CONTENT STORAGE

BACKGROUND

Computing systems are currently in wide use. Some such computing systems allow application developers to build applications that can be run in various different contexts.

Such applications often operate on, and use, data that is stored in a central database. The application calls a central database service and uses that service to store information at a central location, which has a number of impacts. For instance, the application developer must open an account and spin up the database service in order to store and access data in the database service. Similarly, it can be difficult to move the data from the central database service location, without deleteriously affecting the application and without being cumbersome for the application developer.

The discussion above is merely provided for general background information and is not intended to be used as an aid in determining the scope of the claimed subject matter.

SUMMARY

A reference to a digital item is stored as a digital card. The digital card can also be contained in, and/or refer to, other digital cards. The digital card can also include properties or attributes that may be added from the digital item that is being referred to. The digital card can be stored in a data pod within a de-centralized data storage system architecture.

A metafolder system manages a graph that identifies activities that are performed with respect to digital cards and that identifies relationships among the digital cards. The digital cards from a plurality of different locations in the de-centralized data storage system architecture can be aggregated for projection as coming from a single virtual location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 15 is one example of a projection.

FIG. 16 is one example of a projection.

FIG. 17 is one example of a projection.

DETAILED DESCRIPTION

The present description describes a system which provides a data layer that application developers or other users can use to store application metadata without having to run any servers or databases in database systems where the data is stored. The application metadata is stored on digital cards in digital files or pods. The application developers or other users interact with a data pod accessing system (which may be a software developer kit- or SDK) to interact with the digital cards without directly accessing the data in the digital cards. The pods are stored on existing data storage systems. The existing data storage systems handle security, authentication, and access control so that the data pod accessing system need not handle all of the diverse types of security that are implemented by those different types of data storage systems. The digital cards can be extended by different users or application developers and stored in decentralized locations. A metafolder system tracks relationships among digital cards. The metafolder system also tracks activities performed with respect to a digital card. A projection generation system can aggregate digital cards from multiple pods in the decentralized system and present the aggregated digital cards to a user as coming from a single virtual location.

Figure 1:
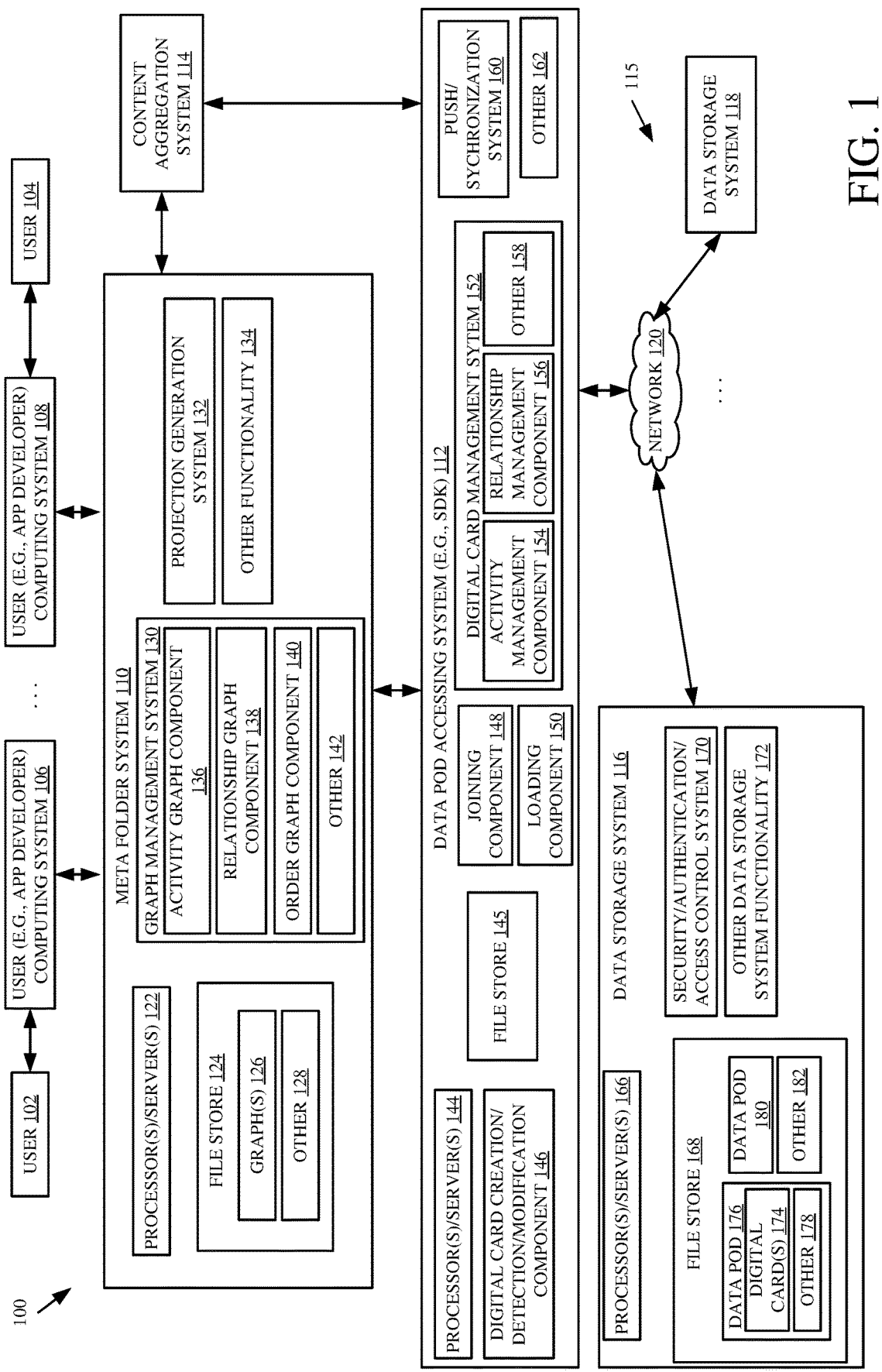
FIG. 1 is a block diagram of one example of a computing system architecture.

FIG. 1 is a block diagram of one example of a computing system architecture 100 in which a plurality of different users 102-104 (which may be application developers or other users) use corresponding user computing systems 106-108 to access and interact with data stored on a plurality of different data storage systems 116-118 in a decentralized data storage system architecture 115, without needing to directly interact with data storage systems 116-118.

Computing system architecture 100 also includes metafolder system 110, data pod accessing system (which may be a software developer kit or SDK) 112, content aggregation system 114. In the example shown in FIG. 1, data pod accessing system 112 has access to data storage systems 116-118 over network 120. Network 120 can be a wide area network, a local area network, a cellular network, a Wi-Fi network or any of a wide variety of networks or combinations of networks. Data pod accessing system 112 exposes an interface which can be accessed by metafolder system 110 and/or user computing systems 106 and 108. The interface can be used to create digital cards which are digital representations of other heterogeneous digital items. The digital cards refer to those digital items and include metadata from the digital items and may include different properties that users or developers can add, and other information. Data pod accessing system 112 stores the digital pods (which can each contain a plurality of digital cards) on data storage systems 116-118 each of which may be any of a wide variety of different types of data storage systems that can be distributed and decentralized. The interface exposed by data pod accessing system 112 can also be used to retrieve digital cards from different pods in data storage systems 116-118 and aggregate them (such as by joining them). Metafolder system 110 can be used to present a view of the digital cards joined from different pods in the decentralized architecture 115 to a requesting user 102-104 as if the digital cards come from a single virtual location or data store. Data pod accessing system 112 may also expose an interface that allows users 102-104 to add digital cards within other digital cards and to express relationships between the digital cards. In addition, users 102-104 can perform activities with respect to the digital cards. The relationships between cards and activities performed on digital cards may be stored in a graph corresponding to the digital cards by metafolder system 110. Metafolder system 110 then allows users 102-104 to query the data cards, to view them in different projections, and to perform other activities described in greater detail below. Before describing the overall operation of architecture 100 in more detail, a description of some of the items in architecture 100, and their operation, will first be provided.

Metafolder system 110 includes one or more processors or servers 122, and file store 124, which may store graphs 126 and other information 128. System 110 can also include graph management system 130, projection generation system 132, and other functionality 134. Graph management system 130 can include activity graph component 136, relationship graph component 138, order graph component 140, and other items 142. Pod data accessing system 112 can include one or more processors or servers 144, file store 145, digital card creation/deletion/modification component 146, joining component 148, loading component 150, digital card management system 152 (which can include activity management component 154, relationship management component 156, and other items 158), push/synchronization system 160, and other functionality 162.

Data storage systems 116-118 can be similar or different. For purposes of the present discussion, it will be assumed that they are similar so that only data storage system 116 is described in greater detail. Data storage system 116 illustratively includes one or more processors or servers 166, file store 168, security/authentication/access control system 170, and other data storage system functionality 172. File store 168 can store a plurality of digital cards 174 as files in a file structure referred to as data pod 176. The data pod 176 can include other items 178 as well. File store 168 can also store other data pods 180 and other information 182. When a request is received for a digital card 174, security/authentication/access control system 170 performs the security operations to control user authentication, access control, and other security measures for accessing the requesting digital card 174. In doing so, system 170 may user external systems, such as token issuing systems, external authentication systems, etc. Suffice it to say that the data storage system 116, where the requested digital card 174 is stored, handles all of the security, authentication, access control, etc. functionality for providing access to that digital card so that data pod accessing system 112 need not handle that functionality except, perhaps, to provide the identity of the requesting user, any tokens provided by the user computing system, etc.

A user 102 can provide an input indicating that the user 102 wishes to create a digital card representing an underlying digital item. The underlying digital items for which digital cards can be created can include a wide variety of different types of digital items (e.g., heterogeneous digital items), such as a document, a message, a website, a drawing, digital items generated by meetings systems, or a wide variety of other digital items. In response to the user input, content aggregation system 114 obtains metadata from the underlying digital item and provides the metadata to digital card creation/deletion/modification component 146. Component 146 creates the digital card (which has the same structure as—is homogeneous with respect to—other digital cards, even through the underlying digital item is a different type of digital item than—is heterogenous with respect to—those represented by the digital cards) and outputs the digital card for storage on one of data storage systems 116-118. The data storage system holding the data pod (which can be a personal data pod that is personal to a user or a shared data pod) where the digital card is to be stored handles the specific storage operation.

A user can also provide an input indicating that the user wishes to review the digital card representing the underlying digital item. In that case, loading component 150 identifies the digital card representing that item and loads the digital card. In some examples, the user may request to view an aggregation of multiple different digital cards, in which case loading component 150 loads all of those digital cards. In doing so, loading component 150 provides the request to the set of data storage systems 116-118, and data storage systems 116-118, themselves, handle the authentication and authorization and other security or access control functions corresponding to the digital cards. Joining component 148 then joins the information from the different digital cards (obtained from the decentralized data storage systems architecture 115), so that the information can be presented to the requesting user as if it comes from a single data storage location.

Digital card management system 152 allows users to manage the digital cards, such as performing activities with respect to the digital cards and generating relationships with respect to the digital cards. For instance, user 102 may generate a digital card and share that digital card with user 104. In that case, activity management component 154 provides an indication to metafolder system 110 that the digital card has been shared. The activity management component 154 may also provide an indication of the actor (user 102) who performed the activity and the recipient (user 104) who received the results of the activity. There also may be instances where a user wishes for one digital card to contain a reference to another digital card in which case the first digital card (which contains the second digital card) may have a "contain" relationship with respect to the second digital card (the digital card that is contained within the first digital card). The second digital card may, itself, contain other digital cards, and so on. Digital card management system 152 modifies the data structure of the digital card and provides outputs to metafolder system 110 indicating the activity, relationship changes, etc., that have been performed with respect to the digital card.

When a user makes a change to a digital card, push/synchronization system 160 pushes the changes to the different digital cards that are affected by the change in data storage systems 116-118.

Graph management system 130 in metafolder system 110 maintains one or more graphs corresponding to the digital cards. The graphs can be used to query the digital cards and generate projections using the digital cards. Activity graph component 136 generates a graph element indicative of activities that are performed with respect to a digital card (such as sharing or opening a digital card). Relationship graph component 138 generates a graph element on the graph indicative of the relationships among the different digital cards. Order graph component 140 maintains an order in which the digital cards have been created, modified, deleted, etc. The graphs are stored as graphs 126 (which may be directed acyclic graphs—DAGs, or other graph structures) in file store 124, and the graphs 126 can be queried so that projection generation system 132 can generate a projection corresponding to the digital cards.

Order graph component 140 can access or generate a time stamp corresponding to each activity and relationship, such as when a particular digital card was created or deleted, when the digital card was modified, when a relationship was added to another digital card, when an activity was performed with respect to a digital card, etc. The digital cards can be ordered in terms of the time stamps or the digital cards can be queried in terms of the time stamps, or the time stamps can be used in other ways as well.

Figure 2:
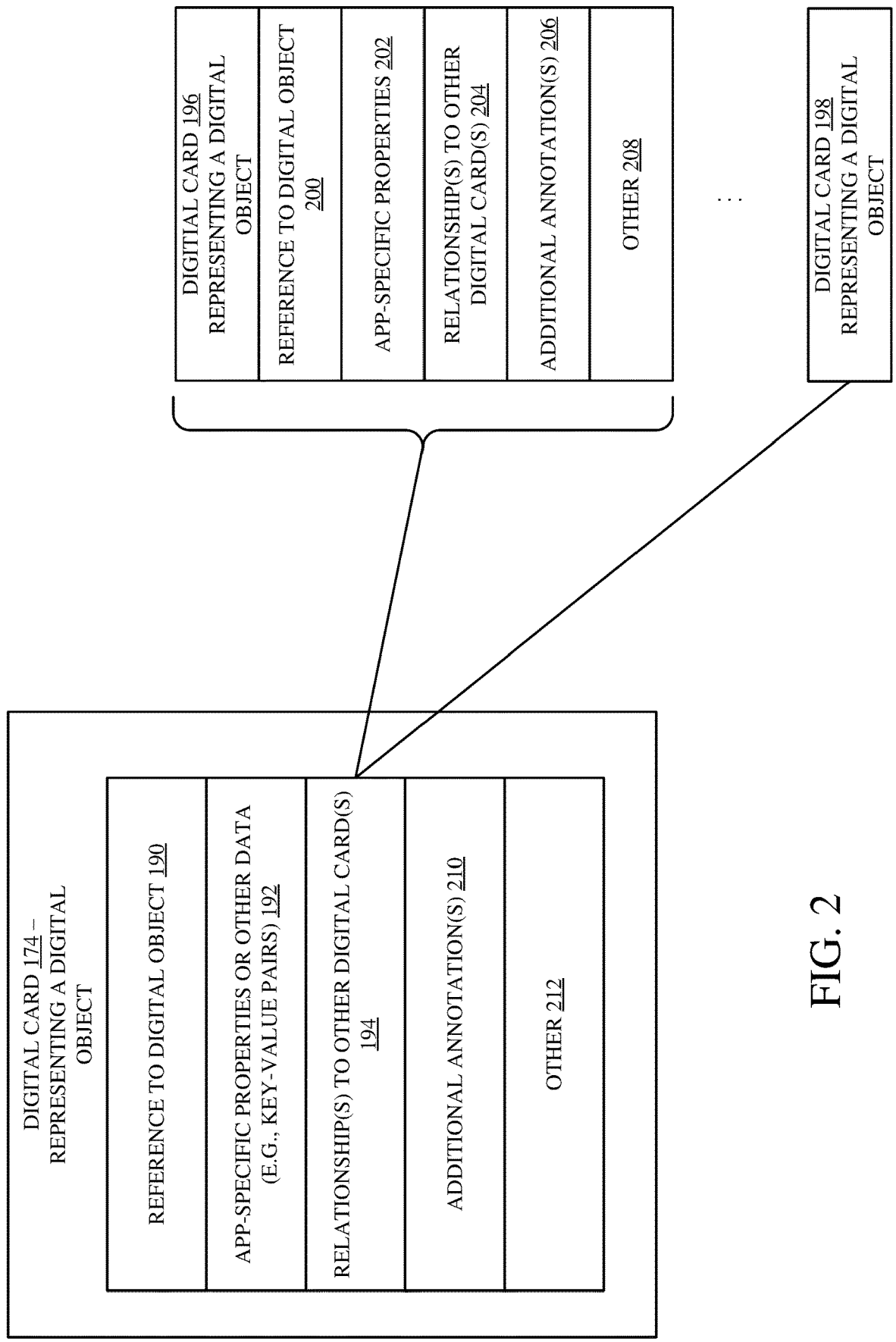
FIG. 2 shows a block diagram of one example of a digital card.

FIG. 2 shows one example of a digital card 174. A digital card 174 may include reference to an underlying digital item, such as a file, website, drawing, object from a meeting system or electronic mail system, etc. Once a user provides an input indicating that a digital card is to be made to represent a particular digital item, content aggregation system 114 extracts or otherwise obtains metadata from the digital item. The metadata is included in the digital card 174 to represent the underlying digital item. In one example, digital card 174 includes a reference to the digital item, such as a URL or other reference, as indicated by block 190. Digital card 174 can also include application-specific properties which may be represented as key value pairs 192 and other items 212.

Digital card 174 can also include relationship indicators 194 which show relationships to other cards 196-198. The relationship indicators 194 may indicate that digital card 174 contains other cards 196-198, as well as an identifier that identifies the other cards 196-198. Each of the digital cards 196-198 may, themselves, represent digital items and include a reference 200 to the digital item, application-specific properties 202, relationship indicators that identify relationships to still other digital cards 204, and additional annotations 206, as well as other items 208.

Figure 3:
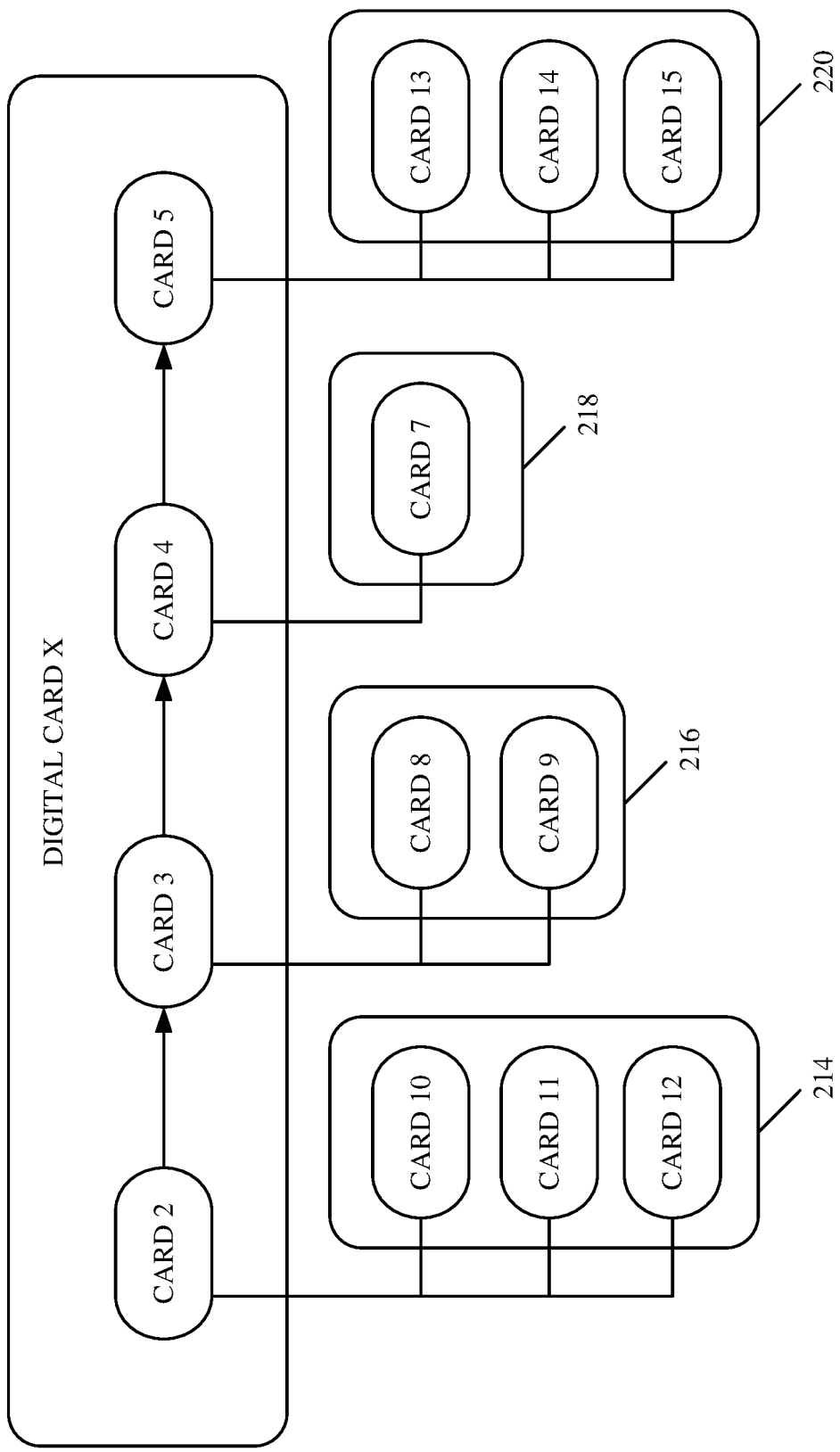
FIG. 3 and FIG. 4 show examples of graph structures.
Figure 4:
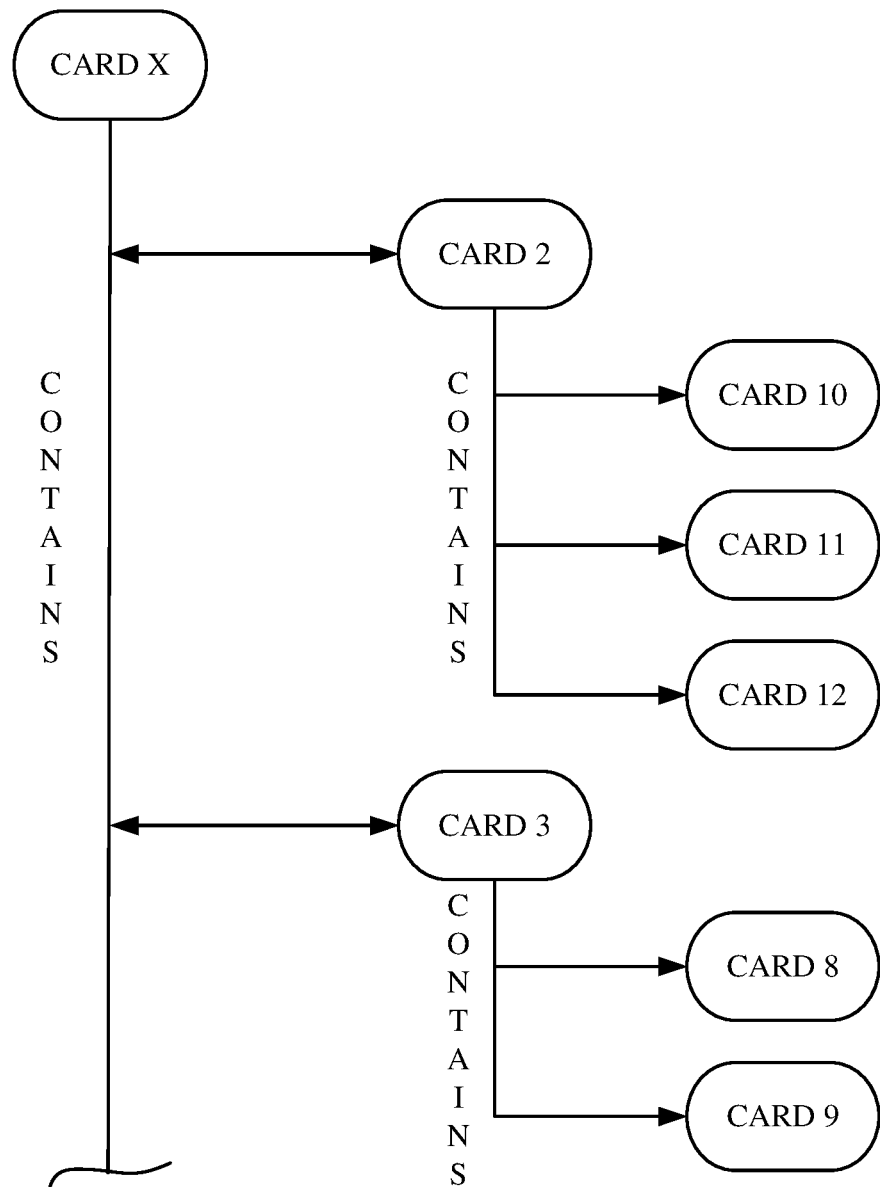

FIGS. 3 and 4 show two different representations of graph structures that can be used to represent graphs 126 in metafolder system 110. FIG. 3 shows a graph structure that includes a first digital card X that contains a plurality of other digital cards (or has relationship indicators 194 identifying the other digital cards shown in FIG. 2). In FIG. 3, digital card X contains digital card 2, digital card 3, digital card 4, and digital card 5. FIG. 3 also shows that digital card 2 may, itself, contain a collection 214 of other digital cards including digital card 10, digital card 11, and digital card 12. FIG. 3 shows that digital card 3 may include a collection 216 of other digital cards including digital card 8 and digital card 9. Digital card 4 may include a collection 218 comprising digital card 7. Digital card 5 may include a collection 220 of other digital cards, which includes digital card 13, digital card 14, and digital card 15. Thus, the cards in collection 214 may be referred to as child cards of the parent digital card 2 which may be referred to, itself, as a child of the parent digital card X. Similarly, the cards in collection 216 may be referred to as children of card 3 which, itself, may be referred to as a child of card X. The same may be true of the digital cards in collection 218 and 220.

FIG. 4 shows a diagram of another structure that can be used to represent graphs 126. FIG. 4 specifically shows that the relationship among the different cards is identified as a "contains" relationship. Therefore, in FIG. 4, it can be seen that card X "contains" card 2 and card 3. Similarly, card 2 "contains" card 10, card 11 and card 12 while card 3 "contains" cards 8 and 9. In one example, the "contains" relationship is identified in the relationship indicators 194 that identify relationships to other digital cards shown in FIG. 2. Therefore, when card X has a relationship identifier 194 that identifies card 2, then it can be determined that card X "contains" card 2. Thus, the "contains" relationship keeps an indirect reference indicating whether a card belongs to more than one other cards and allows a direct reference from a single card to discover what the parents are of that single card. In one example, a single digital card can have only a single direct parent. References to a particular digital card may be held in multiple other digital cards, but the particular digital card may be represented only once on a particular data store 116-118.

Figure 5A:
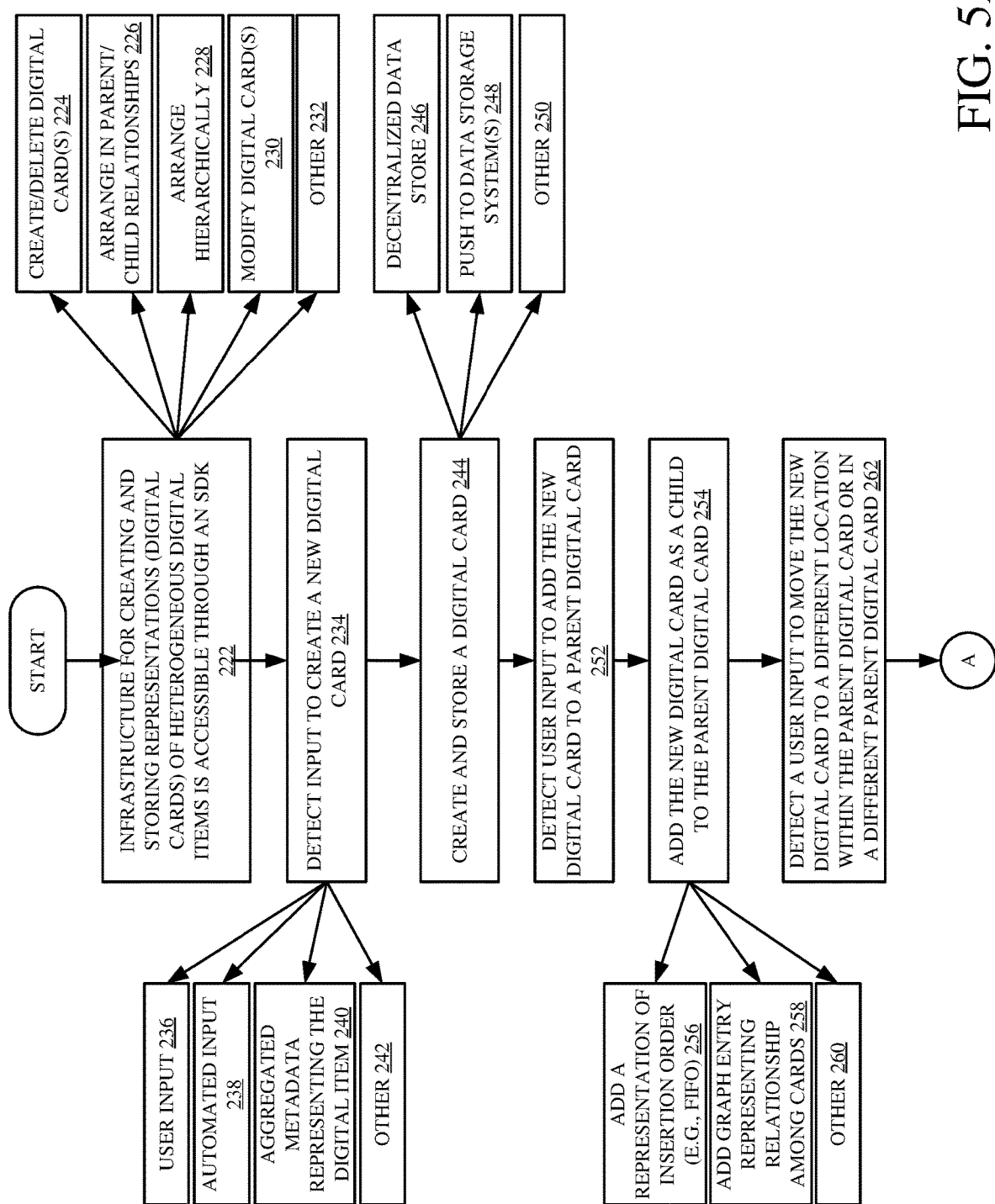
FIGS. 5A, 5B, and 5C (collectively referred to herein as FIG. 5), show one example of the operation of the computing system architecture.
Figure 5B:
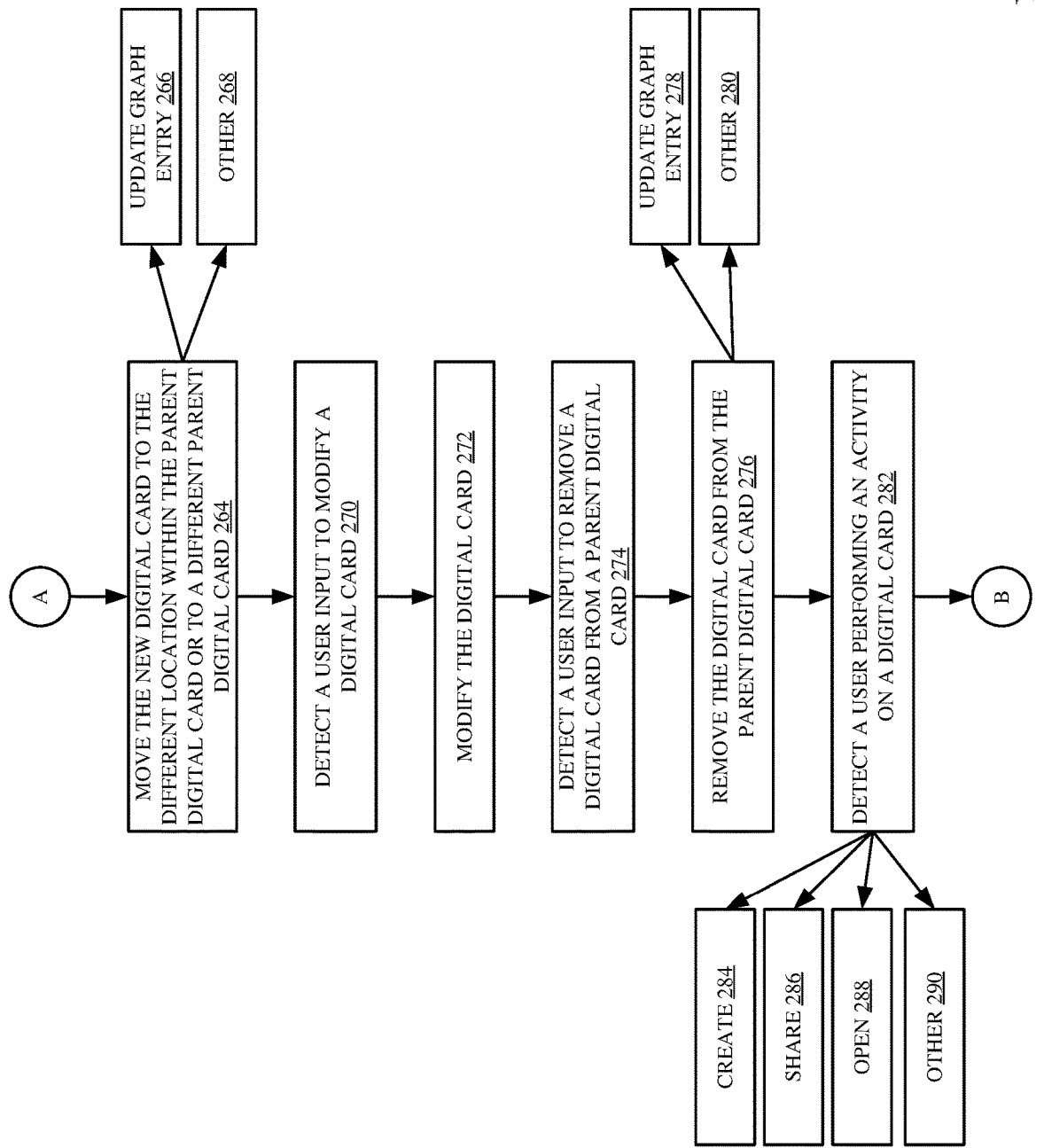
Figure 5C:
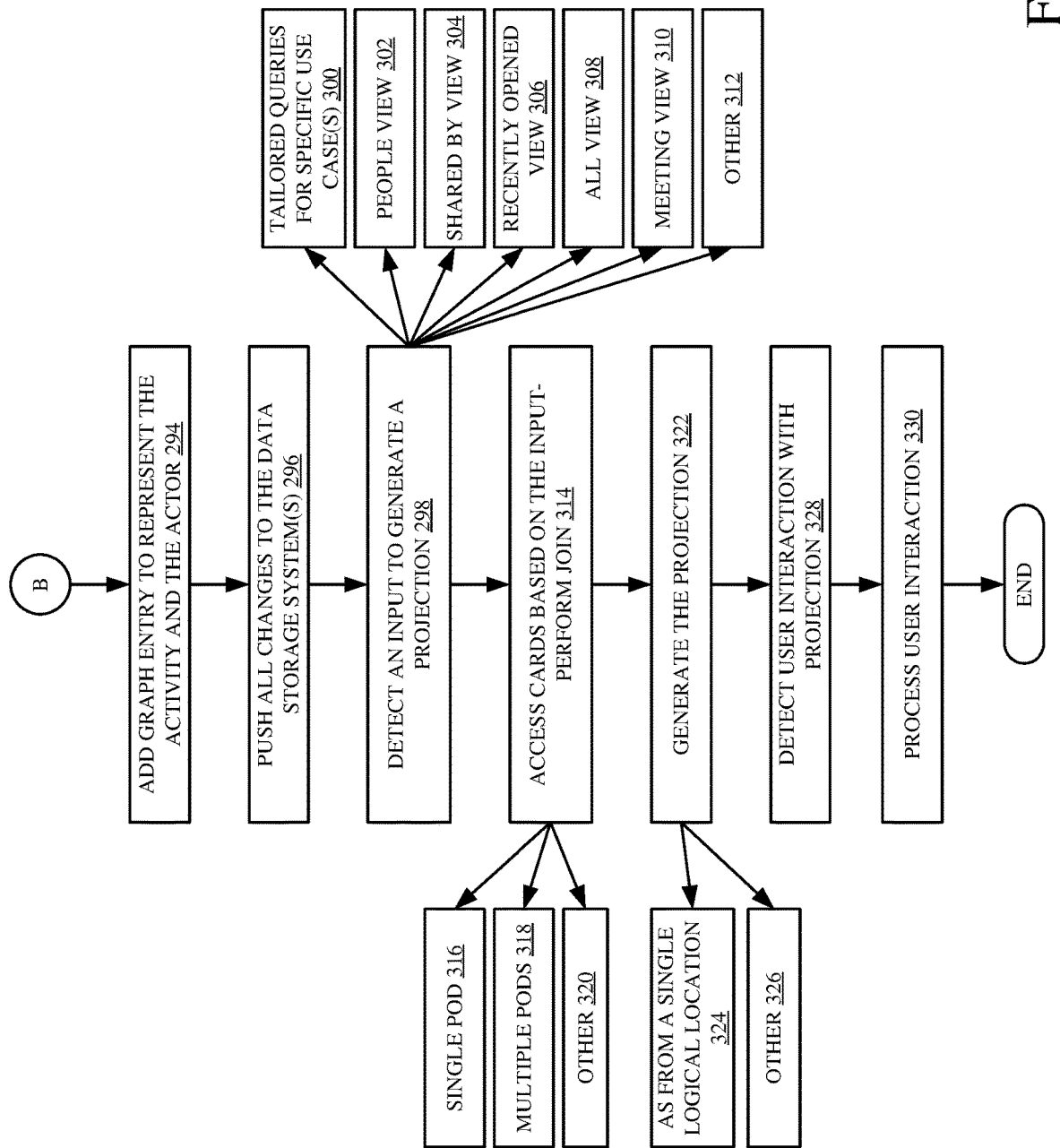

FIGS. 5A, 5B, and 5C (collectively referred to herein as FIG. 5) show a flow diagram illustrating one example of the operation of computing system architecture 100. In the example shown in FIG. 5, it is first assumed that the infrastructure for creating and storing representations (digital cards) of heterogeneous digital items is accessible through data pod accessing system (e.g., SDK) 112. Having the infrastructure in place is indicated by block 222 in the flow diagram of FIG. 5. The infrastructure illustratively allows a user or another computing system to create or delete digital cards, as indicated by block 224. The infrastructure illustratively allows the arrangement of the digital cards in the "contains" (e.g., parent/child) relationships or other relationships as indicated by block 226. The infrastructure allows the digital cards to be arranged or queried in hierarchical order (such as when the digital cards were created or deleted or modified, when activities where performed on them, etc.) as indicated by block 228. The infrastructure illustratively allows the computing system to modify digital cards, as indicated by block 230 and/or to perform a wide variety of other functions with respect to digital cards, as indicated by block 232.

Metafolder system 110 (or data pod accessing system 112, where it is directly accessible by client computing systems 106-108) then detects an input to create a new digital card, as indicated by block 234 in the flow diagram of FIG. 5. The request is provided to digital card creation/deletion/modification component 146. The request may be a user input 236 or an automated input 238. In one example, the request may be provided to content aggregation system 114 which aggregates the metadata that will be used to create the digital card for the underlying digital item. Thus, the request may be input along with the metadata or the metadata can be obtained after the request is received, based upon the request. Obtaining the aggregated metadata representing the underlying digital item is indicated by block 240 in the flow diagram of FIG. 5. The request to create a new digital card may be received in other ways and include other information as well, as indicated by block 242.

Digital card creation/deletion/modification component 146 then creates a digital card, such as digital card 174 shown in FIG. 2, and outputs it for storage in one or more of decentralized data storage systems 116-118, as indicated by block 244. The push/synchronization system 160 may push the information corresponding to the newly created digital card to the decentralized data storage systems, or it may be provided in other ways. Storing the digital card on a decentralized data storage system is indicated by block 246. Pushing the data to the one or more storage systems is indicated by block 248. The digital card can be created and stored in other ways as well, as indicated by block 250.

Creating a new digital card is discussed in greater detail below with respect to FIG. 6.

At some point, data pod accessing system 112 detects or receives a user input indicating that the user wishes to generate a relationship between digital cards, such as to add the new digital card, as a child digital card to a parent digital card, as indicated by block 252 in the flow diagram of FIG. 5. Again, the request may be received through metafolder system 110, or directly from computing systems 106-108.

Relationship management component 156 then adds the newly created digital card as a child to the parent digital card that is identified in the request, as indicated by block 254. Adding a digital card as a child in a parent digital card is described in more detail below with respect to FIG. 7. In one example, relationship management component 156 also generates a time stamp or other indicator indicating a representation of the order in which the newly created digital card was inserted into the parent digital card, relative to other child digital cards in that parent digital card. Adding a representation of the insertion order is indicated by block 256. The relationship management component 156 then provides an indication that the newly created digital card was inserted as a child in a parent digital card to graph management system 130. Relationship graph component 138 generates an entry in the graph 126 corresponding to the parent digital card and the newly created digital card. The graph entry is indicative of the relationship between the parent and child digital cards (e.g., the "contains" relationship). Generating the graph entry is indicated by block 258 in the flow diagram of FIG. 5. The new digital card can be added to a parent digital card, as a child, in other ways as well, as indicated by block 260.

At some point, a user may also provide an input indicating that the user wishes to move the new digital card to a different location either within the current parent digital card or in a different parent digital card, as indicated by block 262. By way of example, and referring again to FIG. 4, it may be that the user provides an input indicating that card 3 should be relocated from its current location (its source location) to a position above card 2 within the parent card X (its destination location). In another example, the user may request that card 3 be removed from its position in parent card X (its source location) and inserted as a child to a different card, such as into card 12 (its destination location). These are just examples of a request that may be received to reposition a digital card within a parent or to another parent.

In response to the request, relationship management component 156 moves the new digital card from its source location to the destination location within the parent digital card, or to a destination location in a different parent digital card altogether. In one example, moving the new digital card to a different location within the parent may be indicated by changing the order that the relationship indicator 194 (in FIG. 2) is inserted, among the other relationship indicators 194, in the parent card 174. In another example, the relationship indicator for the new digital card may be removed from the parent digital card 174 and placed in another parent digital card as a relationship indicator 194 in that parent digital card. Moving the new digital card from its source location to a destination location is indicated by block 264 in the flow diagram of FIG. 5. Moving a digital card from a source location within a parent digital card, or to a destination location in the same or a different parent digital card, is described in greater detail below with respect to FIG. 8.

Again, relationship management component 156 can provide an output indicating the new relationship to graph management system 130. Relationship graph component 138 can update the graph 126 to identify the new relationship, and order graph component 140 can indicate the time at which the relationships were changed. Updating the graph entry is indicated by block 266 in the flow diagram of FIG. 5. The new digital card can be moved from a source location to a destination location in other ways as well, as indicated by block 268.

It may also be that, at some point, data pod accessing system 112 receives an input to modify the information in a digital card, such as to add new properties, to modify property values, etc. Detecting a user input to modify a digital card is indicated by block 270 in the flow diagram of FIG. 5. Digital card creation/deletion/modification component 146 then retrieves the digital card and modifies it, as indicated by the request. Modifying the digital card based on a request is indicated by block 272 in the flow diagram of FIG. 5. Modifying a digital card is described in greater detail below with respect to FIG. 9. The modified information may be provided to push/synchronization system 160 which pushes the modification to one or more of the decentralized data storage systems 116-118.

It may also be that data pod accessing system 112 detects a user input to remove a digital card from a parent digital card, as indicated by block 274 in the flow diagram of FIG. 5. In that case, relationship management component 156 can access the parent digital card, remove a reference to the child digital card (the relationship indicator 194), or remove the digital card from the parent digital card in another ways, as indicated by block 276. Removing a digital card from a parent digital card is described in greater detail below with respect to FIG. An output indicative of this modified relationship is also provided from component 156 to graph management system 130. Relationship graph component 138 then modifies the graph 126 to reflect the new or modified relationship, as indicated by block 278. A digital card can be removed from a parent digital card in other ways as well, as indicated by block 280.

It may also be that data pod accessing system 112 receives an input indicating that a user is performing an activity with respect a digital card, as indicated by block 282. Such activities may include creating a digital card as indicated by block 284, sharing a digital card with another user as indicated by block 286, opening or reading a digital card as indicated by block 288, or performing another activity 290. Activity management component 154 generates an output to graph management system 130 indicating that an activity has been performed with respect to a digital card. Activity graph component 136 then modifies the corresponding graph 126 to show the activity and an actor who performed the activity. Adding a graph entry to represent the activity and the actor is indicated by block 292 in the flow diagram of FIG. 5. Again, all of the changes to the digital cards and the relationships may be pushed to the decentralized data storage system 115 by push/synchronization system 160, as indicated by block 296 in the flow diagram of FIG. 5.

Metafolder 110 may then receive an input indicating that a user wishes to have a projection of the digital cards generated for user viewing or for consumption in other ways. Detecting an input to generate a projection is indicated by block 298 in the flow diagram of FIG. 5. The input may be an input identifying a tailored query for a specific use case, as indicated by block 300. Such queries can be used to generate a "people" view 302, a "shared by" view 304, a "recently opened" view 306, an "all" view 308, a "meeting" view 310, or any of a wide variety of other views 312. Generating a projection, and some example projections that may be generated, are described in greater detail below with respect to FIGS. 11-17. In response to the request to generate a projection, the digital cards are accessed and loaded by loading component 150 and the information from those cards is joined together by joining component 148. The joined information is then provided to projection generation system 132 which generates the projections.

Accessing the digital cards is indicated by block 314 in FIG. 5. It will be noted that the digital cards may be accessed from a single pod 316, or from multiple pods spread out across the decentralized storage systems 115 as indicated by block 318, or from other locations 320. It should also be noted that the data storage systems 116-118, where the pods are stored, themselves perform the security/authentication/access control on the digital cards in the pods so that such processing need not be performed by data pod accessing system 112 or metafolder system 110. Instead, such processing is left to the storage system, itself, where the pods are stored. Generating the projection is indicated by block 322. In one example, the projection is generated so that the multiple digital cards appear to be stored on a single logical location 324. The projection can be generated in a wide variety of other ways 326 as well.

The projection may also be interactive so that the projection generation system 132 can detect user interactions with the projection, as indicated by block 328 and process those user interactions, as indicated by block 330. For instance, the user interactions may be to filter the projection in some way, or to otherwise process the information generated on the projection.

Figure 6:
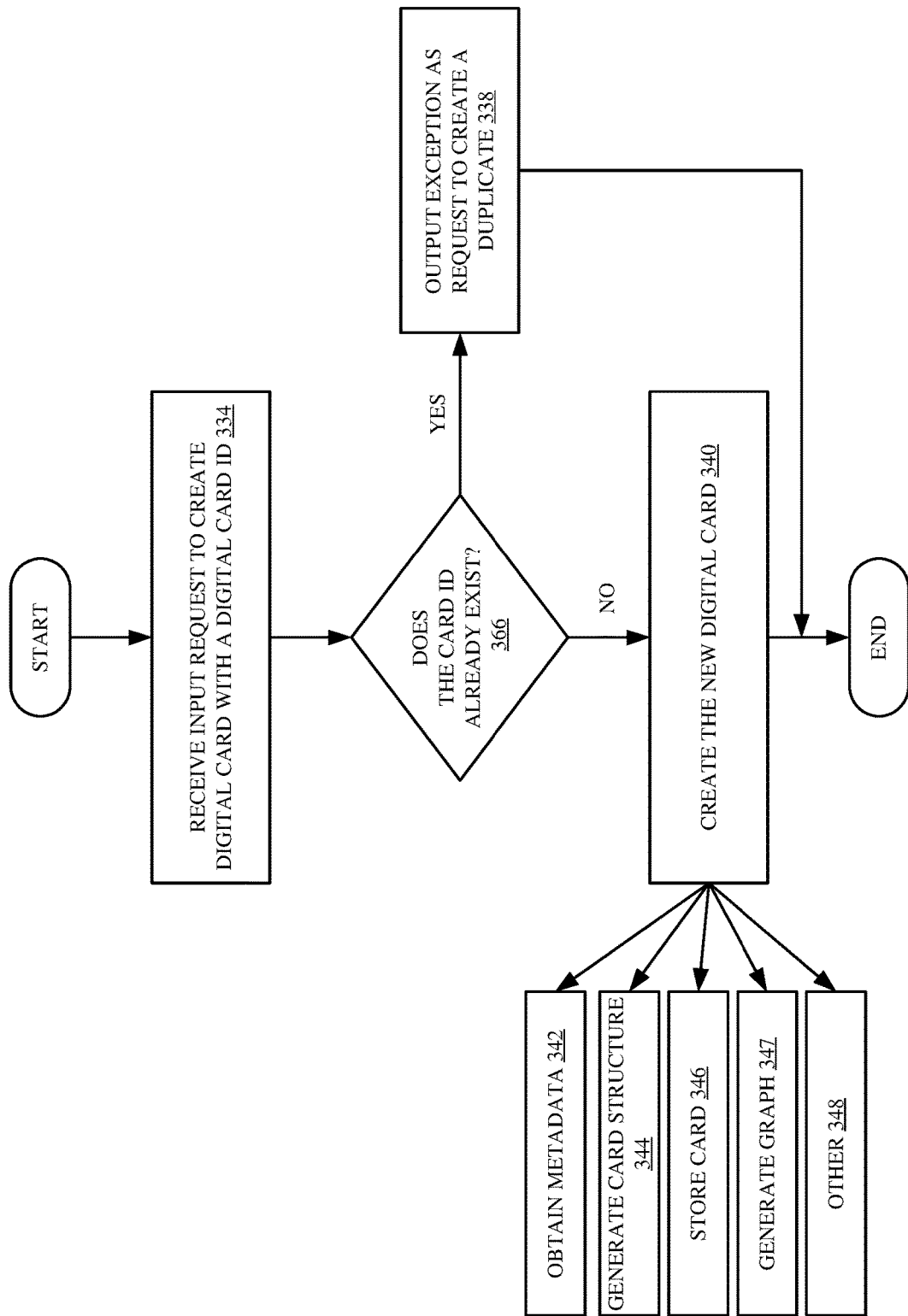
FIG. 6 is a flow diagram illustrating one example of creating a digital card.

FIG. 6 is a flow diagram illustrating one example of the operation of digital card creation/deletion/modification component 146 in creating a digital card. Component 116 receives an input request to create a digital card. The request can include a digital card identifier (ID) or the digital card ID can be created by component 146 after receiving the request. Receiving the request is indicated by block 334 in the flow diagram of FIG. 6. The request can be received directly from one of the user computing systems 106-108 or the request can be received through metafolder system 110 or in other ways. Component 146 can access the graphs 126 in data store 124 or another data store to determine whether the digital card ID already exists, at block 336. If so, component 146 can trigger the generation of an exception indicating that the request is requesting the system to create a duplicate digital card, as indicated by block 338. Assuming, at block 336, that the digital card ID does not already exist, then component 146 creates the new digital card, as indicated by block 340.

In one example, if the metadata used in generating the digital card is not provided along with the request, then component 146 can obtain the metadata (representing the underlying digital object that is represented by the digital card) from content aggregation system 114 or from another source, as indicated by block 342. Component 146 then generates the card structure (such as that shown in FIG. 2) and populates the card structure with the obtained metadata, as indicated by block 344. Component 146 can then provide the information to one or more data storage systems 116-118 and allow those systems to store the digital card, as indicated by block 346. The new card can be created in other ways or with other information, as indicated by block 348.

An indication that the new card has been created can be provided from component 146 to graph management system 130 so that a graph 126 can be generated for the new digital card.

Figure 7:
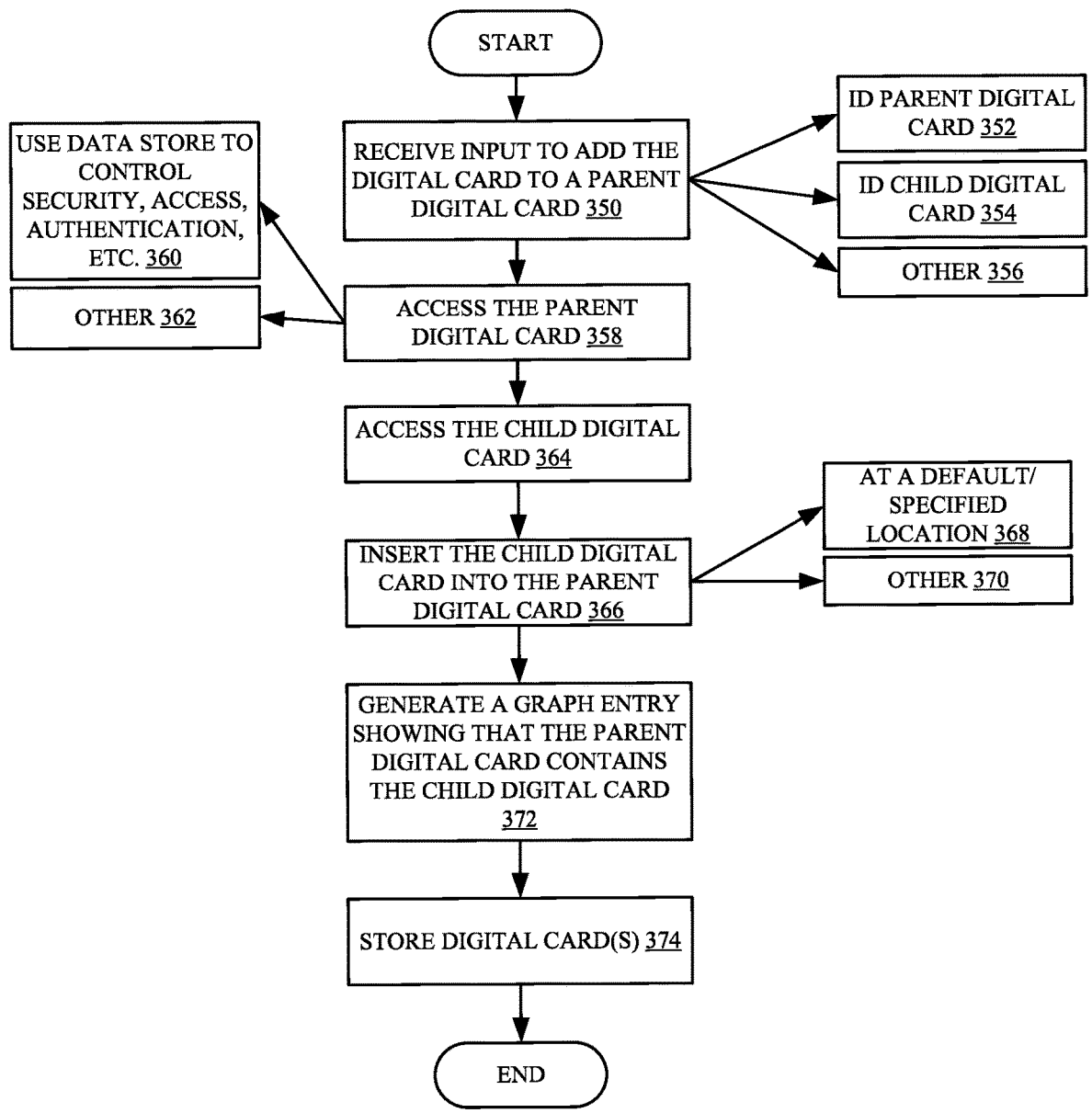
FIG. 7 is a flow diagram illustrating one example of creating a relationship between two digital cards.

FIG. 7 is a flow diagram illustrating one example of the operation of relationship management component 156 in adding a digital card into another digital card. Relationship management component 156 receives an input indicating that a user wishes to add a first digital card to a second digital card so that the first digital card is in a child relationship relative to the second digital card which is in a parent relationship to the first digital card. In another example, the first digital card can be referred to as "containing" the second digital card. Receiving an input to add a child digital card to a parent digital card is indicated by block 350 in the flow diagram of FIG. 7. The input to add a child card to a parent card may include the parent digital card ID as indicated by block 352 and the child digital card ID is indicated by block 354. The request or input may include a wide variety of other information 356 as well.

Relationship management component 156 then accesses the parent digital card, as indicated by block 358. Again, component 156 uses the data storage system 116-118 where the parent digital card is stored to perform the security, authentication, access control processing to determine whether the user requesting access to the digital card is permitted to have access. Using the data storage system 116-118 to control these functions is indicated by block 360 in the flow diagram of FIG. 7. Accessing the parent digital card can be done in other ways as well, as indicated by block 362.

Relationship management component 156 then accesses the child digital card as indicated by block 364. Again, the underlying data storage system can be used to manage whether the desired access is permissible.

Relationship management component 156 then modifies the parent digital card to insert a reference to the child digital card in the parent digital card. In one example, this may be done by modifying the parent digital card to include a "contains" relationship to a reference of the child digital card such as by inserting a relationship indicator 194 in the parent digital card. Inserting the child digital card into the parent digital card is indicated by block 366 in the flow diagram of FIG. 7. Thus, the child digital card, itself, may not be inserted into the parent digital card, but a reference (relationship indicator 194) to the child digital card is inserted into the parent digital card along with a property indicating that the parent digital card is in a "contains" relationship to the child digital card. Relationship management component 156 can insert the reference to the child digital card at a position within the parent digital card (such as above or below other references to child digital cards in that same parent digital card) either at a default location in the parent digital card, or at a specified location which may be specified in the request to insert the child digital card, or that may be specified in other ways. Inserting the reference to the child digital card at a default or specified location within the parent digital card is indicated by block 368 in the flow diagram of FIG. 7. The child digital card may be inserted into the parent digital card in other ways as well, as indicated by block 370.

The information indicating when and where the child digital card was inserted into the parent digital card can be provided to relationship graph component 138 which generates a graph entry in the graphs 126 for the parent and/or child digital cards. Generating the graph entries is indicated by block 372 in the flow diagram of FIG. 7. The parent and child digital cards can then be stored in the respective data storage systems 116-118, as indicated by block 374.

Figure 8:
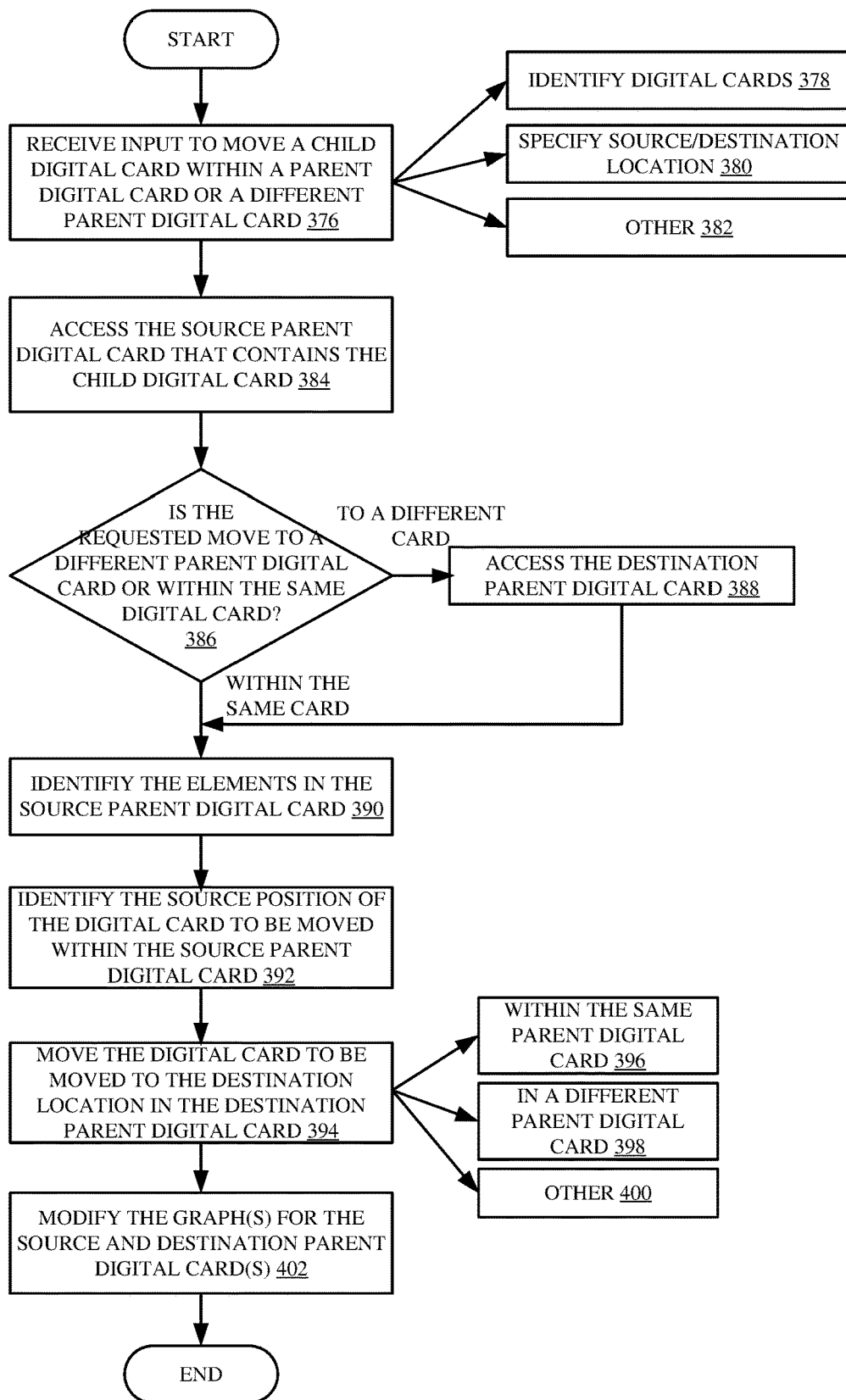
FIG. 8 is a flow diagram illustrating one example of moving a child digital card from a source location to a destination location.

FIG. 8 is a flow diagram illustrating one example of the operation of relationship management component 156 in moving the position of a child card, from a source location to a different destination location within the parent card, or to a destination location in a different parent card, altogether. Component 156 receives an input to move a child digital card either within a parent digital card or to a different parent digital card. Receiving the input is indicated by block 376 in the flow diagram of FIG. 8. The request may identify both the parent digital card and the child digital card as well as the different parent digital card, if the request is to move the child digital card to a different parent. Identifying the digital cards involved in the request is indicated by block 378.

The request may also specify the source and destination locations of the child digital card. For instance, the request may identify as the source location the location within the current parent digital card where the child digital card may be found, as well as the new location in the parent digital card where the child digital card with reside after it is moved. Specifying the source and destination locations is indicated by block 380 in the flow diagram of FIG. 8. The request maybe received in other ways and the request may include other information as well, as indicated by block 382.

Component 156 then accesses the source parent digital card (the digital card that currently contains the child digital card) as indicated by block 384. If the requested move is to a different parent digital card, as determined at block 386, then component 156 also accesses the destination parent digital card (the digital card where the child digital card will be moved to) as indicated by block 388. Component 156 then identifies the various elements (child digital cards) in the source parent digital card, as indicated by block 390. For instance, there may be multiple child digital cards within the source parent digital card, and those are all identified so that the particular child digital card to be relocated can be identified. Component 156 then identifies the position within the source parent digital card where the child digital card to be moved is located, as indicated by block 392.

Relationship management component 156 then moves the digital card to be moved to the destination location in the destination parent digital card, as indicated by block 394. Again, the destination can be within the same parent digital card, as indicated by block 396, or in a different parent digital card, as indicated by block 398. The digital card can be moved in other ways as well, as indicated by block 400.

Relationship management component 156 generates an output to graph management system 130 indicating that the digital cards has been moved to a new location. Relationship graph component 138 then modifies the graph 126 corresponding to the digital cards that are affected by the relocation to represent that the digital card has been relocated to a new destination location. Modifying the graph(s) is indicated by block 402 in the flow diagram of FIG. 8.

Figure 9:
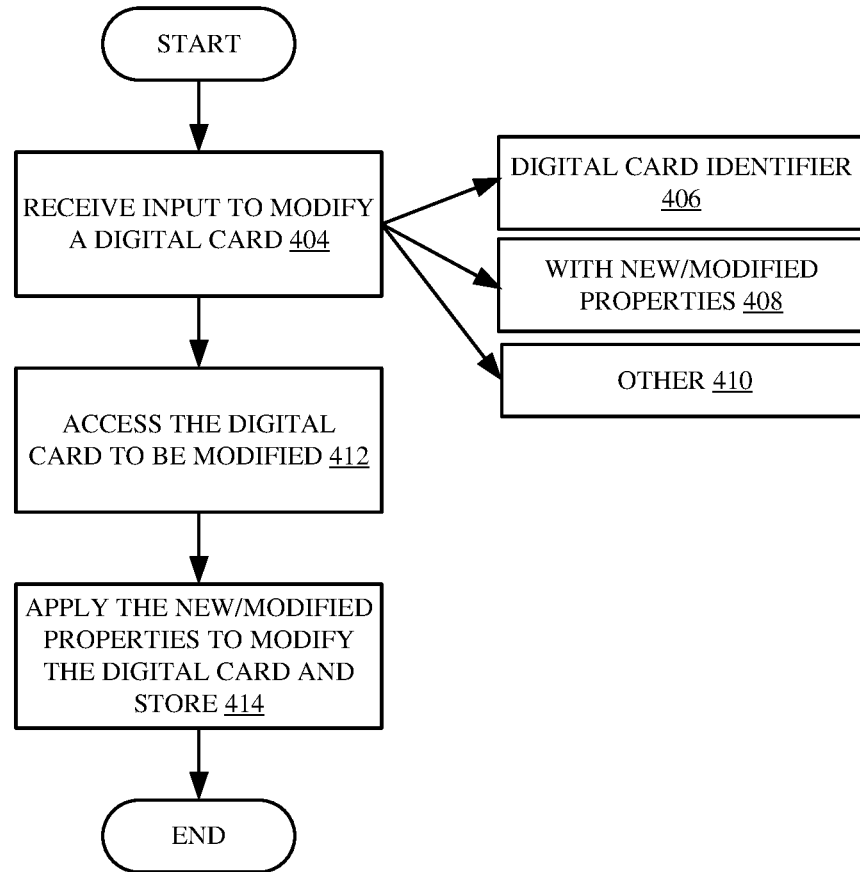
FIG. 9 is a flow diagram illustrating one example of modifying a digital card.

FIG. 9 is a flow diagram showing one example of the operation of digital card creation/deletion/modification component 146 in modifying the content of a digital card. Component 146 first receives an input to modify a digital card. Receiving the input is indicated by block 404 in the flow diagram of FIG. 9. The request may identify the digital card to be modified, as indicated by block 406. The request may also include the new or modified properties of the identified digital card, as indicated by block 408. The request can be received through metafolder system 110 or directly from a user computing system 106-108 and the request may include other items as well, as indicated by block 410.

Component 146 then accesses the digital card to be modified. Component 146 can provide a request for the digital card, along with the identity of the user requesting the digital card, and the requested modification, and/or other information to the data storage system 116-118 where the pod containing the digital card is stored. The data storage system 116-118, itself, handles the security, authentication, and access control. Accessing the digital card to be modified is indicated by block 412 in the flow diagram of FIG. 9. The new or modified properties are applied to the digital card and the digital card is then stored. The push/synchronization system 160 can push the modified properties to locations where the digital card is represented. Applying the new or modified properties to the digital card is indicated by block 414 in the flow diagram of FIG. 9.

Figure 10:
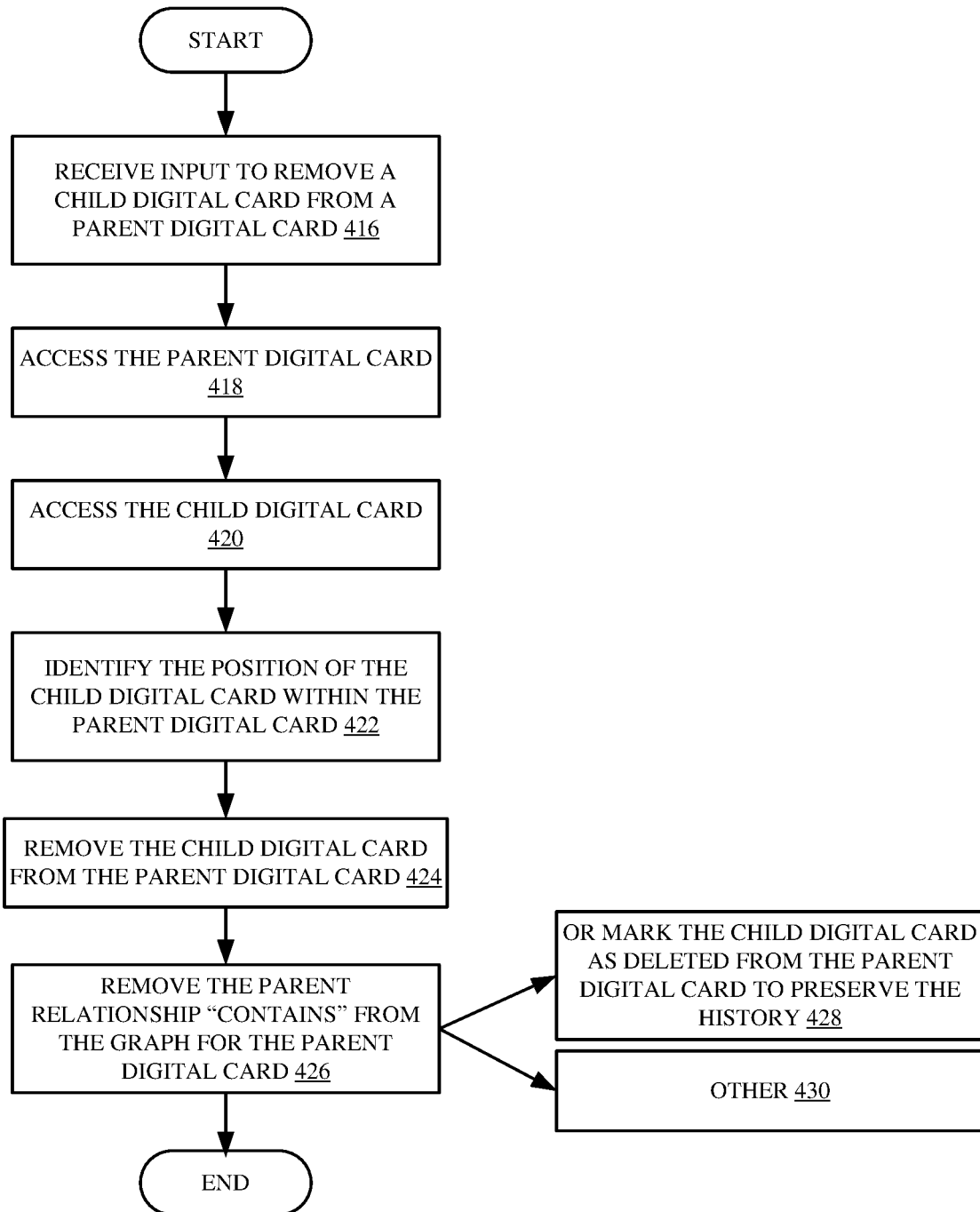
FIG. 10 is a flow diagram illustrating one example of removing a child digital card from a parent digital card.

FIG. 10 is a flow diagram illustrating one example of the operation of relationship management component 156 in removing a child digital card from within a parent digital card. Relationship management component 156 receives an input to remove a child digital card from within a parent digital card, as indicated by block 416 in the flow diagram of FIG. 10. The input or request may identify both the child digital card and the parent digital card those identities can be obtained in other ways. Component 156 then accesses the parent digital card as indicated by block 418 and the child digital card as indicated by block 420. Relationship management component 156 identifies the position of the child digital card within the parent digital card, as indicated by block 422 and removes the child digital card from within the parent digital card, as indicated by block 424. Again referring to the example shown in FIG. 2, relationship management component 156 can remove the reference to the child digital card from within the parent digital card by deleting the relationship identifier 194 for the child digital card from within the parent digital card. In another example, the relationship identifier is retained within the parent digital card but it is marked as having been deleted.

Relationship management component 156 then provides an output to relationship graph component 128 in metafolder system 110 indicating that the child digital card has been removed from the parent digital card, along with a time stamp and possibly other metadata corresponding to the removal request (such as the actor, etc.). Relationship graph component 128 then modifies the graph 126 corresponding to parent and child digital cards to show that the child digital card is no longer "contained" within the parent digital card, as indicated by block 426. In one example, the graph can be modified to delete the child digital card from the graph of the parent digital card or the child digital card can remain in the graph of the parent digital card, but be annotated to show that it was deleted from within the parent digital card. Marking the child digital card as being deleted from the parent digital card to preserve a historical indication that the child digital card was once contained by the parent digital card is indicated by block 428 in the flow diagram of FIG. 10. The graph 126 can be modified in other ways as well, as indicated by block 430.

Figure 11:
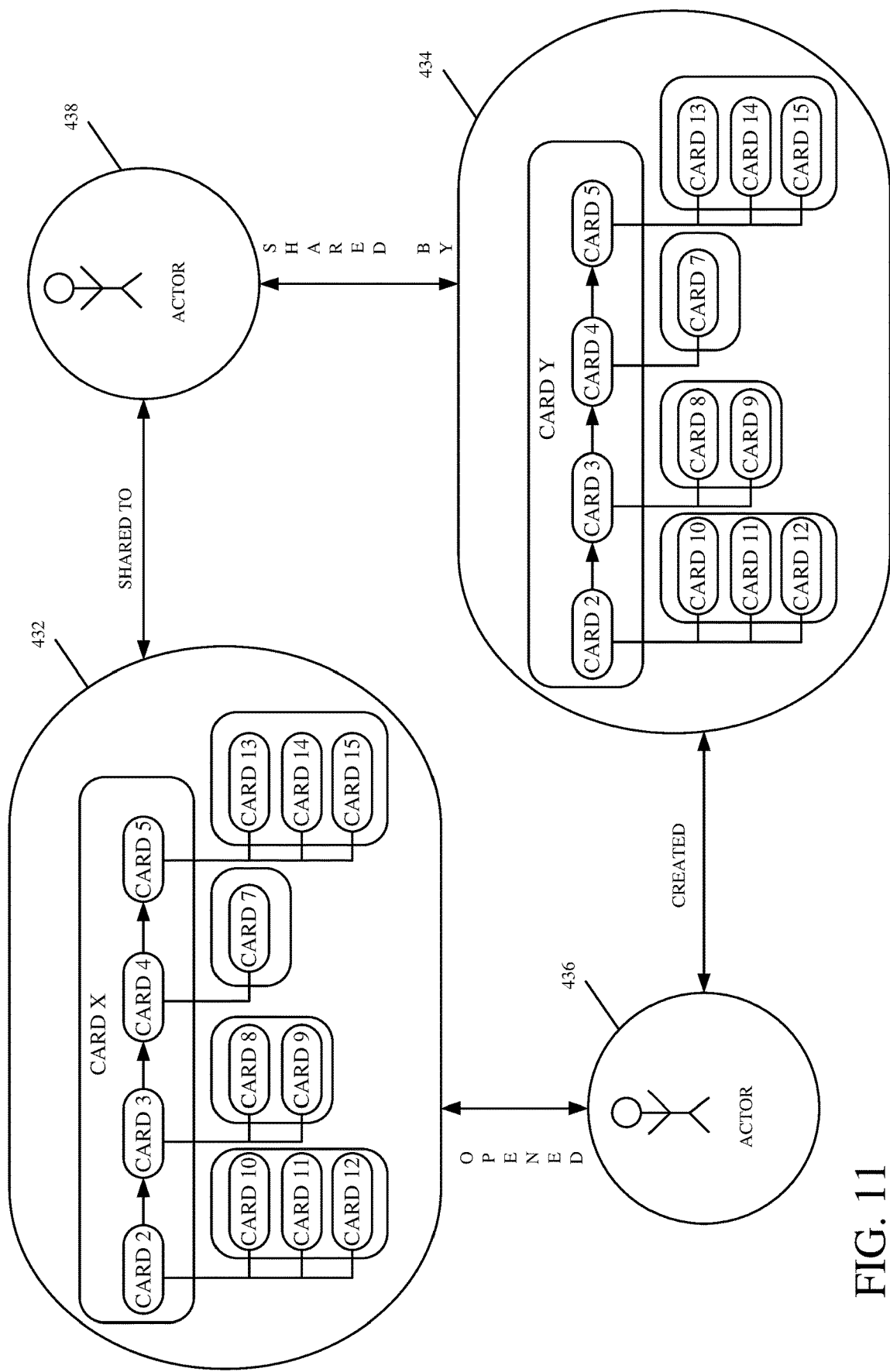
FIG. 11 is one example of how data is modeled with respect to users or actors.

FIG. 11 shows another example of a graph 126 which models a set (or collection) of data pods (or metafolders) 432 and 434. FIG. 11 shows that a single data pod may carry a plurality of different collections of digital cards which may or may not be interconnected. For instance, the graph illustrated in FIG. 11 shows a first collection (or metafolder) 432 and a second collection or metafolder 434. Because the graphs 126 are modeled around the user behavior, if a person performs an activity with respect to one of the sets of pods 432 or 434, the sets of pods may be connected through the actor, on the graph. FIG. 11, for instance, illustrates that a first user or actor 436 has opened collection (or metafolder) 432 and created collection (or metafolder) 434. The graph also shows that collection (or metafolder) 432 was shared to user or actor 438. Further, the graph shows that collection (or metafolder) 434 was shared by actor 438 as well.

Figure 12:
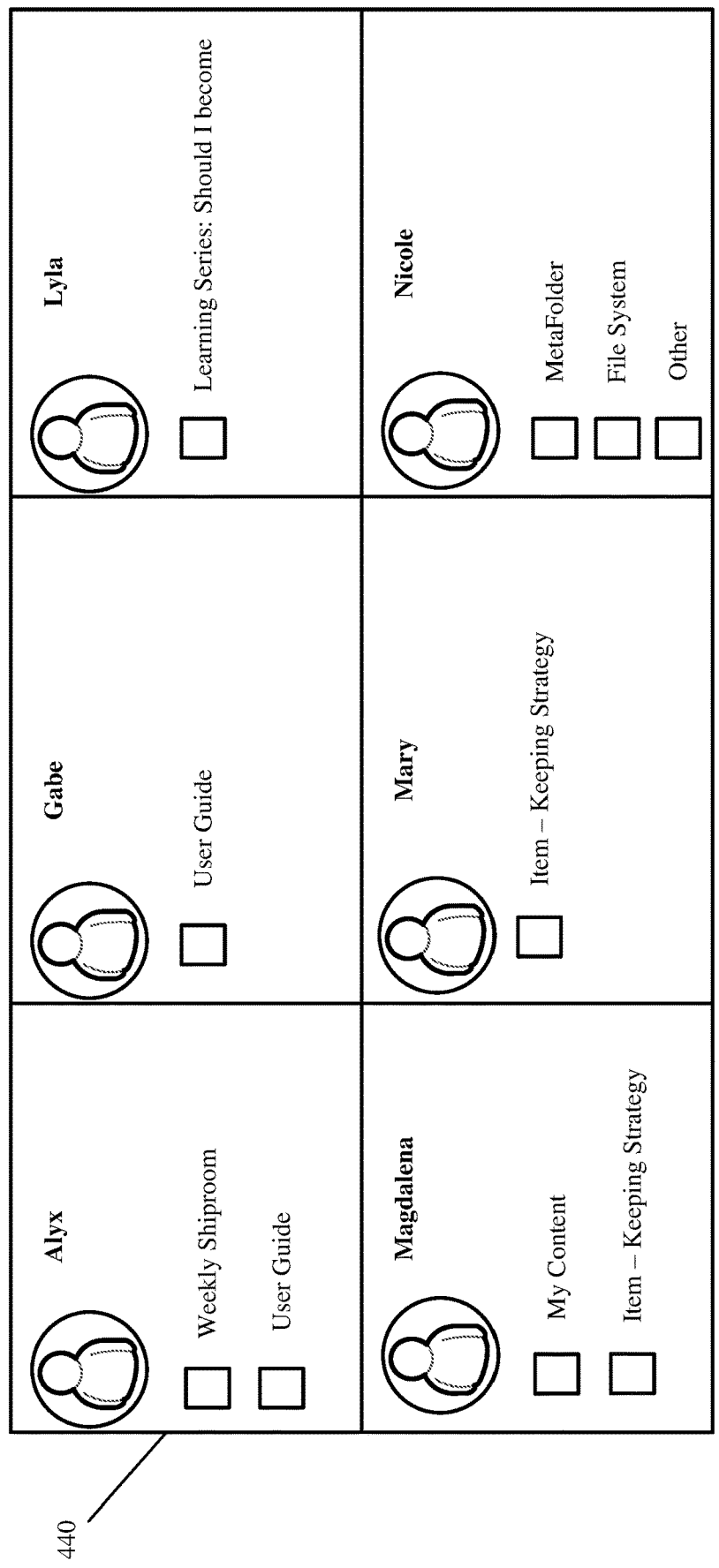
FIG. 12 is one example of a projection.

Projection generation system 132 can traverse graphs 126 or otherwise use graphs 126 and other information to generate views (or projections) of the data stored as digital cards in the decentralized data storage systems 115. In one example, as discussed above, views can be tailored queries for specific use cases. For example, FIG. 12 shows one example of a People view 440. People view 440 is generated by projection generation system 130 by traversing graphs 126 corresponding to a user (e.g., user 102) and grouping digital cards for a specific person, sorted by the persons name Projection 440 shows that a set of people (Alyx, Gabe, Magdalena, Lyla, Mary, and Nicole) are each related to a set of digital cards, which those individual people shared. In order to generate projection 440, projection generation system 132 traverses the graphs 126 from the activity or relationship "shared by". Projection generation system 132 queries all cards that have a "contains" relationship and determines whether each digital card has a corresponding "shared by" activity. If so, the cards are aggregated by person and each person's list of digital cards is sorted by time stamp. Then, the sets of digital cards are sorted based on the person's name, to provide an alphabetical list of people and the digital cards that each person shared.

Figure 13:
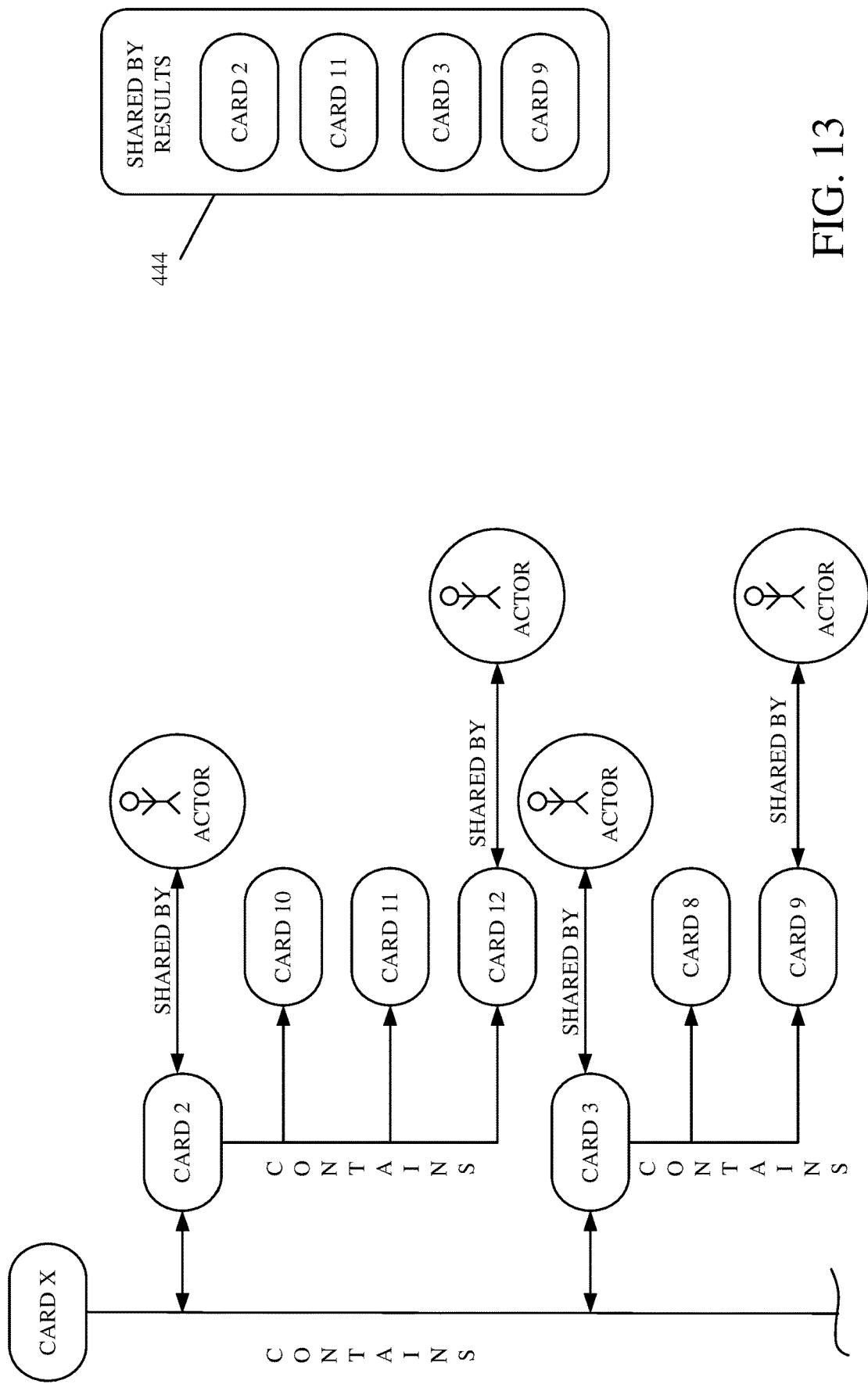
FIG. 13 is another example of how data is modeled with respect to activities and users.
Figure 14:
FIG. 14 is one example of a projection.

FIG. 13 shows the graph structure discussed above with respect to FIG. 4, but actors are incorporated into the graph structure. Each of the actors shown in FIG. 13 is connected to a specific digital card by the "shared by" activity. FIG. 14 shows one example of a "Shared By" projection 442. In order to generate the Shared By projection 442, projection generation system 132 performs similar operations to those described above in order to generate the People view 440 shown in FIG. 12, except that there is no need to aggregate the search results by person. The sorting can be done by time stamp to show the latest shared digital cards first, instead of sorting on person name. Therefore, taking the example shown in FIG. 13, for instance, projection generation system 132 can traverse the graph shown in FIG. 13 to show that digital cards 2, 12, 3 and 9 all have "shared by" activities associated with them, and the graph links to the actor that shared those cards. Thus, the result set 444 will show all of the cards that have the "shared by" activity. In the example shown in FIG. 14, the Shared By display 442 includes a display element for each digital card that has the "shared by" activity. Each digital card is represented by a row of columns in the display 442. The first column in the row names the digital card. The second column indicates when the card was shared. The third column indicates the actor who shared the digital card, and the fourth column shows the most recent activity performed with respect to the digital card, regardless of the activity type. The resultant projection generated by projection generation system 132 is a flat list of digital cards ordered by time when they were shared, in descending order, as shown in FIG. 14. In one example, projection generation system 132 can recursively iterate through each digital card, to all its child digital cards. However, in one example, the number of levels deep in the recursive iteration may be limited to a certain number, in order to avoid recursively iterating through digital cards that have many children, grandchildren, etc.

FIG. 15 shows another example of a projection generated by projection generation system 132 as a "recently opened" projection 444. In an example in which data is modeled based on user behavior, if a user opens a digital object (such as a document) this may automatically trigger the user computing system to generate an event to metafolder system 110 in which activity graph component 136 generates an activity on graph 126 between the digital card representing the digital object opened by the user, and the user. In one example, projection generation system 132 generates the "Recently Opened" view 444 as a flat list of digital cards sorted by the "opened by" activity and the corresponding time stamp, in descending order. In the example shown in FIG. 15, each digital card also contains the event time (when it was opened) the owner (the identity of the user who created the digital card, if available), and a latest activity performed with respect to that digital card, regardless of activity type. Thus, each digital card is represented by a row in the "Recently Opened" display 444. The first column in each row shows the name of the digital card. The second column illustrates when the item was opened. The third column illustrates the owner of the item and the fourth column shows the most recent activity performed with respect to that digital card.

In one example, projection generation system 132 can also generate an "All" view such as view 446 shown in FIG. 16. The "All" view returns a hierarchal list of digital cards so that child cards are also depicted as being hierarchically located within their parent digital cards. The "All" view 446 shows a projection of digital cards based upon the latest activity performed with respect to the digital cards, regardless of the activity type. Thus, the digital cards are sorted based upon the most recent activity performed with respect to the card, regardless of activity type. The "All" view 446 shown in FIG. 16 includes the name of the digital card, the time when the digital card was modified, the owner of the digital card, and the last activity performed with respect to the digital card.

In another example, projection generation system 132 can generate a "Meeting" view such as view 448 shown in FIG. 17. Graph management system 130 can correlate the digital cards in the graphs 126 within a timeline. Time can be modeled as a single node or entity in the graph 126 to allow fast correlation among digital cards and time. Time can also be broken down into more specific pieces which allow range queries and time-based filtering of the digital cards. In the "Meeting" view example shown in FIG. 17, digital cards representing meetings are arranged in descending order of start time.

Figure 18:
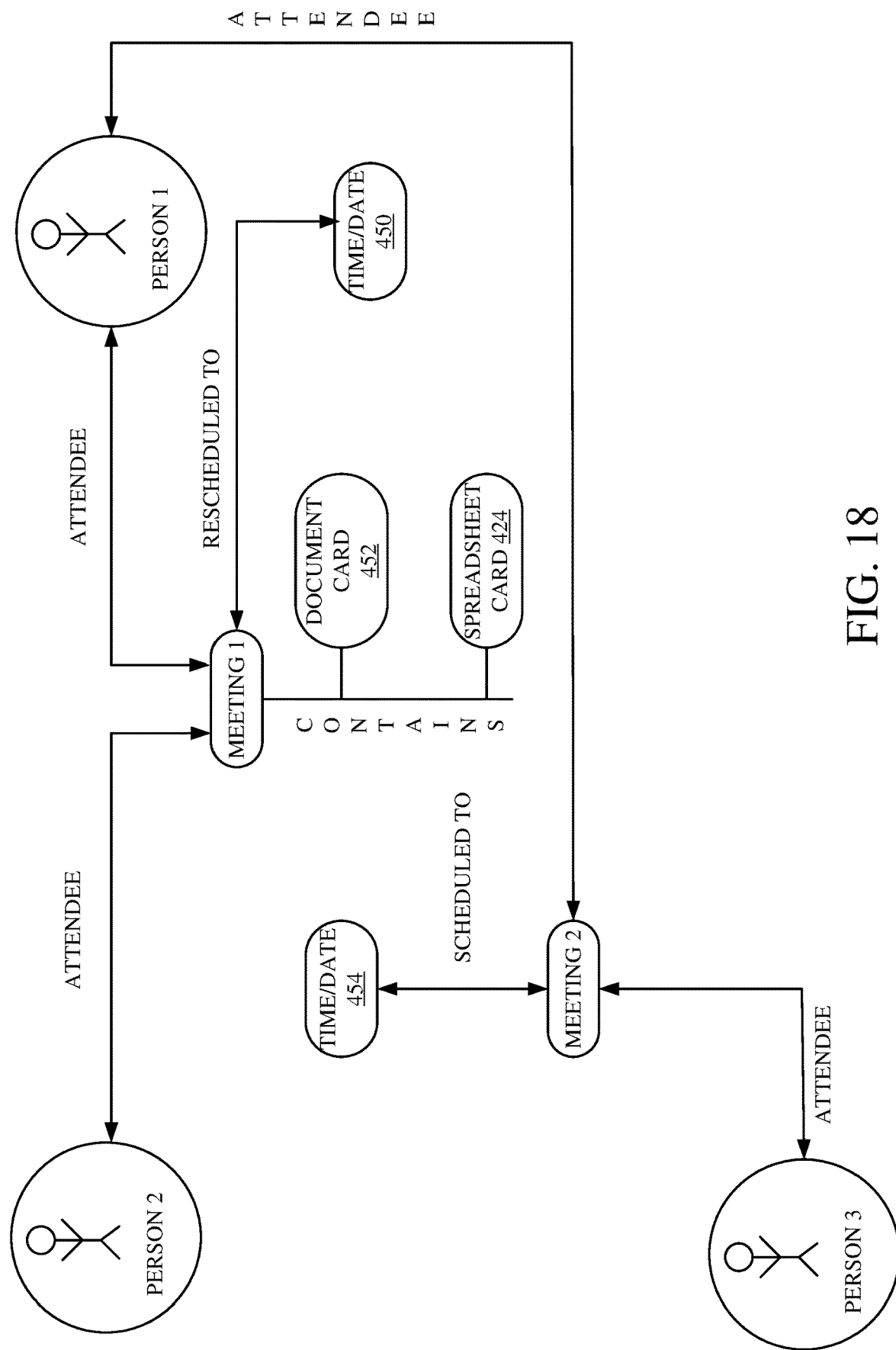
FIG. 18 shows one example of how time is modeled.
Figure 19:
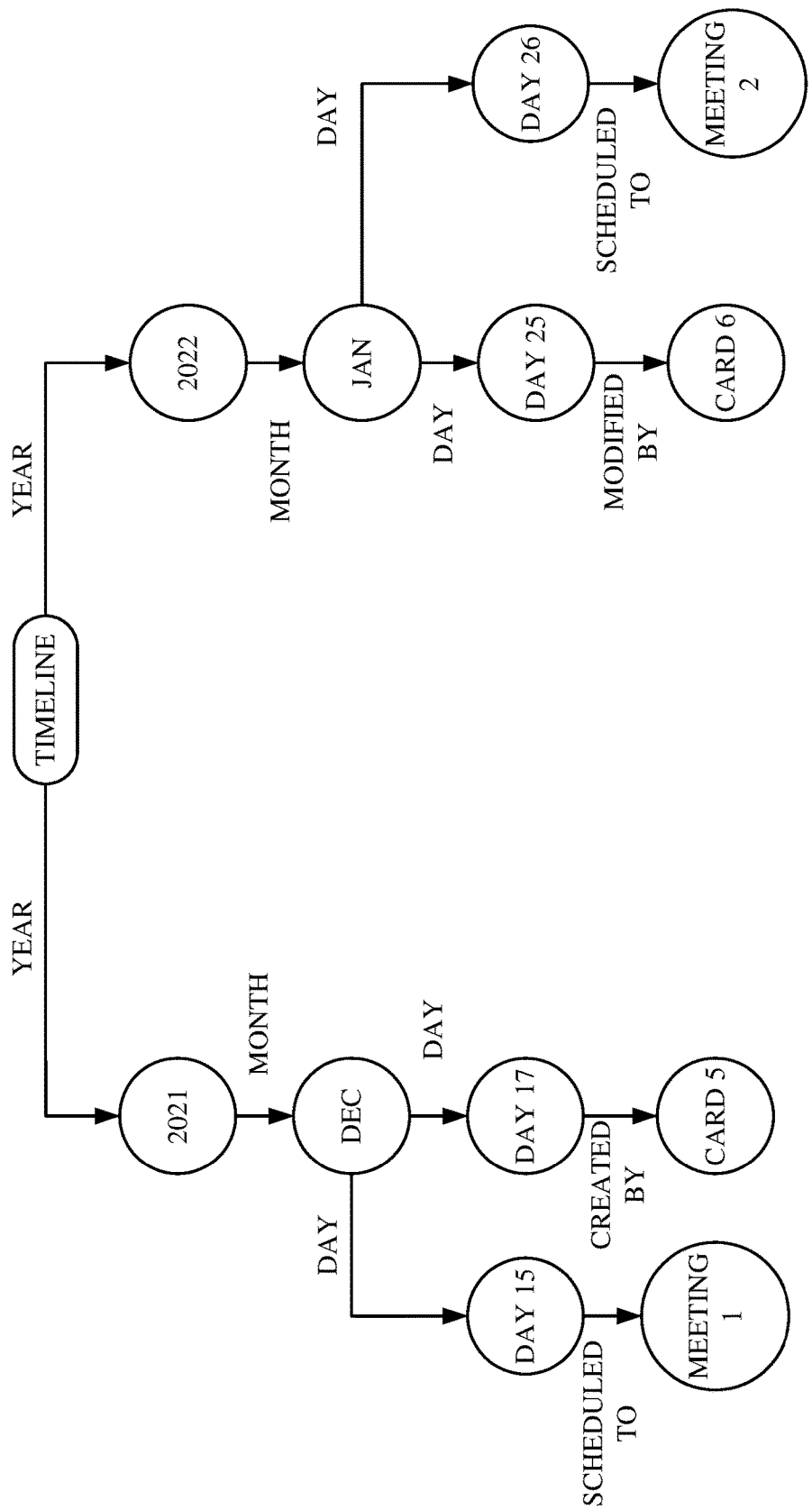
FIG. 19 shows an example of how time is modeled.

FIGS. 18 and 19 shows different ways that graph management system 130 can model time in the graphs 126. FIG. 18 shows an example in which time is represented as a single node. That is, a meeting can be scheduled on a time, a digital card can be modified on a time, an event digital card may start on a time, etc. FIG. 18, for instance, shows that meeting 1 has been rescheduled to a time and date represented by node 450. The meeting has a plurality of digital cards 452 and 454 contained within it. Meeting 1 also has a plurality of attendees (represented by nodes for person 1 and person 2). Also, FIG. 18 shows that meeting 2 has been scheduled to a time represented by digital card 454 and has two attendees, person 1 and person 3. Representing time in such a way may be desired whenever it is needed to know when something happened or will happen on a timeline. For instance, representing time as shown in FIG. 18 facilitates such queries as "What cards were created at time X?" and "Do I have a meeting at time Y?".

FIG. 19, however, represents time in graphs 126 in a different way. In FIG. 19, a timeline tree is formed by breaking down the time and date into smaller nodes. For instance, FIG. 19 shows that the timeline node can be broken into year nodes where year 2021 and 2022 are each represented by a node in the graph. Each year can be broken down into month nodes and each month can be broken down into day nodes. Each of the time nodes in the representation shown in FIG. 9 can have associated digital cards. The structures shown in FIG. 19, in which the time is broken into a timeline, allows different types of queries, such as queries that search for things that occurred within a time range between specified dates, and queries that are for the aggregation of information using dates or time. Some examples of queries that can be supported when modeling time as shown in FIG. 9 include such queries as "How many meetings did I have on 1-26-22?", "What were the digital cards created in January?", "What date was my digital card 6 modified?" and "How many meetings did I have between Dec. 15, 2021 and Jan. 26, 2022?".

It can thus be seen that the present description describes a system which can be used to generate and store digital cards, representing heterogeneous underlying digital objects, in a decentralized data storage system. The decentralized data storage system, itself, handles the security, authentication, and access control to the digital cards, and a digital card accessing system (e.g., an SDK) exposes an interface that allows users to access the stored digital cards from multiple different data storage systems and view them as if they are on a single data storage system. A metafolder system generates graphs corresponding to the digital cards to show activities performed with respect to the digital cards and relationships among the digital cards. Thus, projections can be generated based on queries against the graphs.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, the mechanisms can be actuated using touch gestures. Also, where the device that displays them has speech recognition components, the mechanisms can be actuated using speech commands.

A number of data stores and file stores have also been discussed. It will be noted the data store or file store can each be broken into multiple data stores or file stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 20:
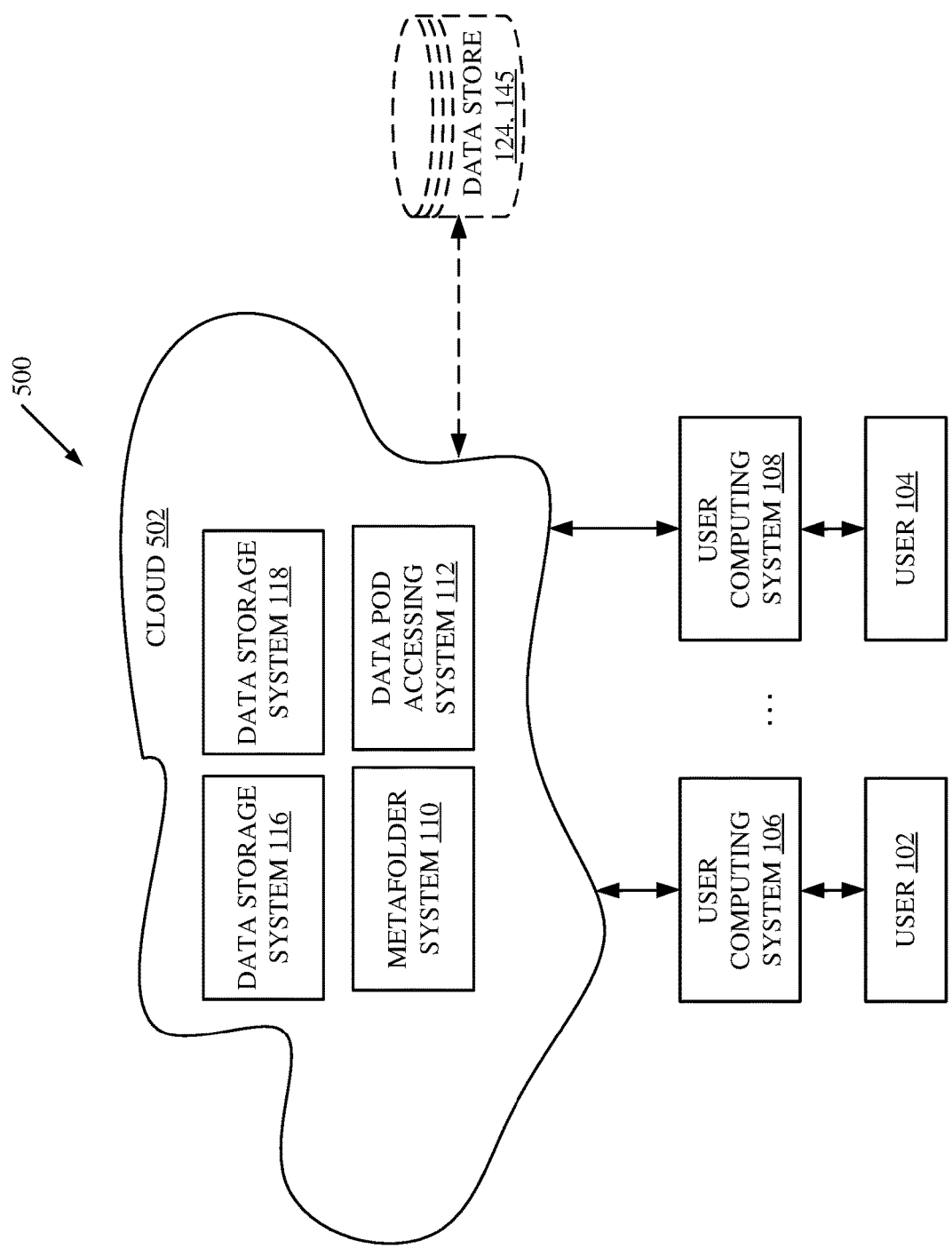
FIG. 20 shows one example of a computing system architecture deployed in a remote server architecture.

FIG. 20 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 20, some items are similar to those shown in FIG. 1 and they are similarly numbered. FIG. 20 specifically shows that de-centralized data storage system architecture 115, metafolder system 110, data pod accessing system 112, and content aggregation system 114 can be located in cloud 502 (which can be public, private, or a combination where portions are public while others are private). Therefore, users 102-103 use user computing systems 106-108 to access those systems through cloud 502.

FIG. 20 also depicts another example of a cloud architecture. FIG. 20 shows that it is also contemplated that some elements of architecture 100 are disposed in cloud 502 while others are not. By way of example, file stores 124, 145 can be disposed outside of cloud 502, and accessed through cloud 502. Regardless of where they are located, the items can be accessed directly by systems 106-108, through a network (either a wide area network or a local area network), the items can be hosted at a remote site by a service, or the items can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 21:
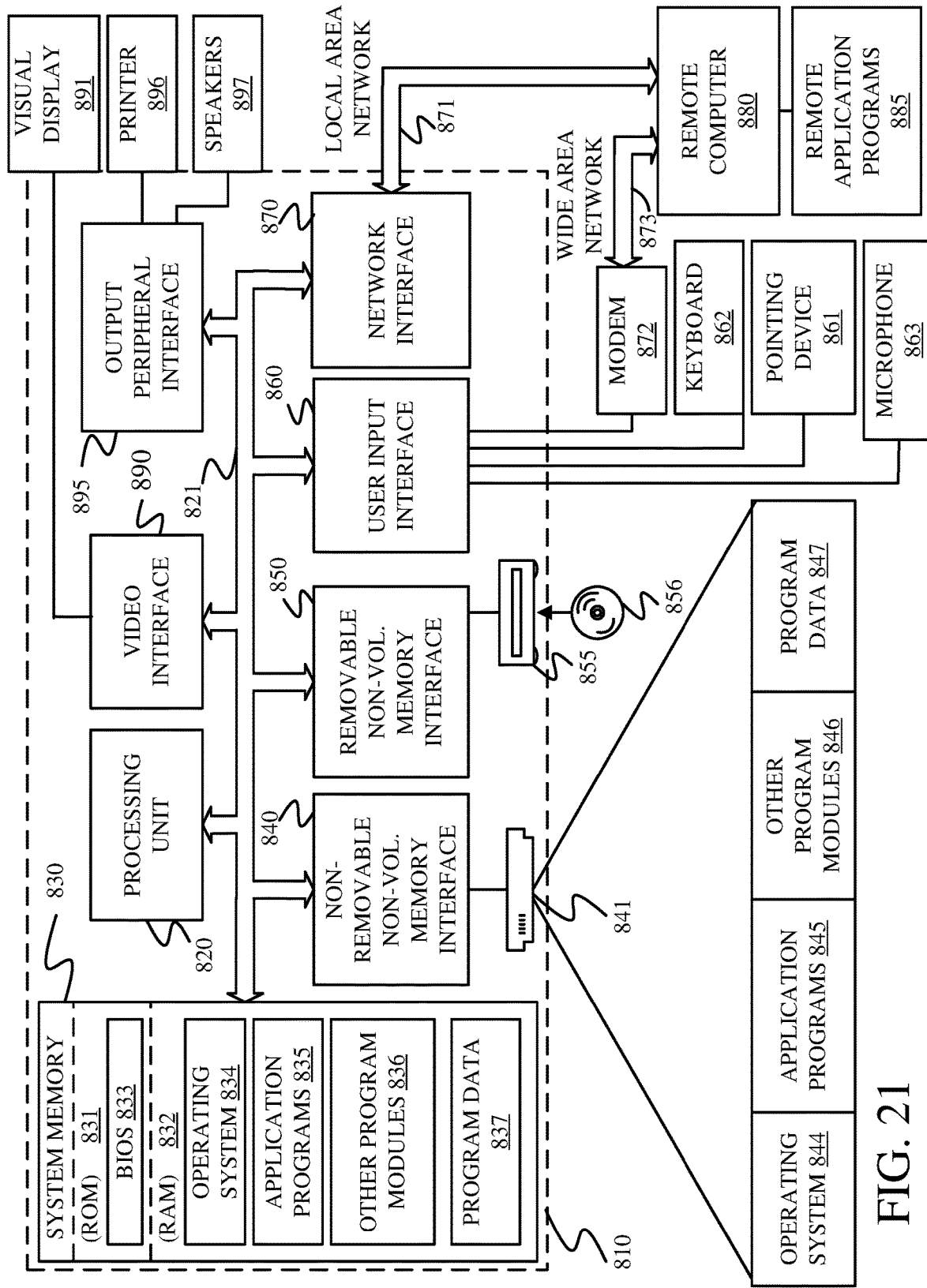
FIG. 21 is a block diagram of one example of a computing environment.

FIG. 21 is one example of a computing environment in which architecture 100, or parts of it, (for example) can be deployed. With reference to FIG. 21, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 21.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 21 illustrates operating system 834, application programs 835, other program modules 836, and program data 837.

The computer 810 may also include other removable/non-removable volatile/nonvolatile computer storage media. By way of example only, FIG. 21 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 21, provide storage of computer readable instructions, data structures, program modules and other data for the computer 810. In FIG. 21, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 21 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 21 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
at least one processor; and
a data store storing computer executable instructions which, when executed by the at least one processor, cause the at least one processor to perform steps, comprising:
detecting, at a data pod accessing system, an input request to create a digital card representing a digital item;
obtaining digital item metadata corresponding to the digital item;
generating the digital card including the item metadata;
generating a card output to store the digital card in a data pod, comprising a plurality of digital cards in a given data storage system of a plurality of data storage systems in a de-centralized data storage system architecture; and
exposing, at the data pod accessing system, an interface to access a set of digital cards, of the plurality of digital cards stored on the de-centralized data storage system architecture, through the data pod accessing system.

Example 2 is the computing system of any or all previous examples wherein the computer executable instructions further comprise computer executable instructions which, when executed by the at least one processor, cause the at least one processor to perform steps further comprising:
receiving, through the interface, a digital card access request to access the set of digital cards;
obtaining access to the set of digital cards from the de-centralized data storage system architecture; and
generating a digital card output at the data pod accessing system indicative of the set of digital cards.

Example 3 is the computing system of any or all previous examples wherein obtaining access to the set of digital cards comprises:
generating a data store request at the data pod accessing system based on the digital card access request;
sending the data store request to at least one of the plurality of data storage systems in the de-centralized data storage system architecture, the data store request including access control information for the at least one of the plurality of data storage systems to perform access control relative to the requested set of digital cards; and
receiving a representation of the requested set of digital cards from the at least one of the plurality of data storage systems in the de-centralized data storage system architecture based on the data store request.

Example 4 is the computing system of any or all previous examples wherein receiving the representation of the requested set of digital cards comprises:
receiving a first representation of a first digital card in the requested set of digital cards from a first data storage system in the plurality of data storage systems in the de-centralized data storage system architecture; and
receiving a second representation of a second digital card in the requested set of digital cards from a second data storage system in the plurality of data storage systems in the de-centralized data storage system architecture.

Example 5 is the computing system of any or all previous examples wherein generating a digital card output comprises:
loading the first and second representations into memory at the data pod accessing system;
joining the first and second representations to obtain a joined set of representations; and
outputting the joined set of representations.

Example 6 is the computing system of any or all previous examples wherein the computer executable instructions further comprise computer executable instructions which, when executed by the at least one processor, cause the at least one processor to perform steps further comprising:
detecting a relationship input indicative of creating a relationship between the first digital card and the second digital card; and
modifying at least one of the first digital card and the second digital card to indicate the relationship.

Example 7 is the computing system of any or all previous examples wherein detecting a relationship input comprises detecting the relationship input indicating that the first digital card contains the second digital card and wherein modifying at least one of the first digital card and the second digital card comprises:
modifying the first digital card to indicate that the first digital card contains the second digital card.

Example 8 is the computing system of any or all previous examples wherein the computer executable instructions further comprise computer executable instructions which, when executed by the at least one processor, cause the at least one processor to perform steps further comprising:
providing a relationship indicator to a graph management system that generates a graph corresponding to the first digital card indicative of the relationship between the first digital card and the second digital card.

Example 9 is the computing system of any or all previous examples wherein the plurality of data storage systems in the de-centralized data storage system architecture store a plurality of data pods and wherein each data pod in the plurality of data pods stores a set of homogeous digital cards representing a set of heterogeneous digital items.

Example 10 is the computing system of any or all previous examples wherein exposing an interface to access the digital cards comprises:
exposing the interface to access the set of homogeneous digital cards representing the set of heterogeneous digital items.

Example 11 is the computing system of any or all previous examples wherein the computer executable instructions further comprise computer executable instructions which, when executed by the at least one processor, cause the at least one processor to perform steps further comprising:
detecting an activity performed relative to the digital card; and
providing an activity indicator to a graph management system that generates a graph corresponding to the digital card indicative of the activity performed relative to the digital card.

Example 12 is a computer implemented method, comprising:
detecting, at a data pod accessing system, an input request to create a digital card representing a digital item;

obtaining digital item metadata corresponding to the digital item;
generating the digital card including the item metadata;
generating a card output to store the digital card in a data pod, comprising a plurality of digital cards in a given data storage system of a plurality of data storage systems in a de-centralized data storage system architecture; and
exposing, at the data pod accessing system, an interface to access a set of digital cards, of the plurality of digital cards stored on the de-centralized data storage system architecture, through the data pod accessing system.

Example 13 is the computer implemented method of any or all previous examples and further comprising:
receiving, through the interface, a digital card access request to access the set of digital cards;
obtaining access to the set of digital cards from the de-centralized data storage system architecture; and
generating a digital card output at the data pod accessing system indicative of the set of digital cards.

Example 14 is the computer implemented method of any or all previous examples wherein obtaining access to the set of digital cards comprises:
generating a data store request at the data pod accessing system based on the digital card access request;
sending the data store request to at least one of the plurality of data storage systems in the de-centralized data storage system architecture, the data store request including access control information for the at least one of the plurality of data storage systems to perform access control relative to the requested set of digital cards; and
receiving a representation of the requested set of digital cards from the at least one of the plurality of data storage systems in the de-centralized data storage system architecture based on the data store request.

Example 15 is the computer implemented method of any or all previous examples wherein receiving the representation of the requested set of digital cards comprises:
receiving a first representation of a first digital card in the requested set of digital cards from a first data storage system in the plurality of data storage systems in the de-centralized data storage system architecture; and
receiving a second representation of a second digital card in the requested set of digital cards from a second data storage system in the plurality of data storage systems in the de-centralized data storage system architecture.

Example 16 is the computer implemented method of any or all previous examples wherein generating a digital card output comprises:
loading the first and second representations into memory at the data pod accessing system;
joining the first and second representations to obtain a joined set of representations; and outputting the joined set of representations.

Example 17 is the computer implemented method of any or all previous examples wherein the computer executable instructions further comprise computer executable instructions which, when executed by the at least one processor, cause the at least one processor to perform steps further comprising:
detecting a relationship input indicative of creating a relationship between the first digital card and the second digital card; and
modifying at least one of the first digital card and the second digital card to indicate the relationship.

Example 18 is the computer implemented method of any or all previous examples wherein detecting a relationship input comprises detecting the relationship input indicating that the first digital card contains the second digital card and wherein modifying at least one of the first digital card and the second digital card comprises:
modifying the first digital card to indicate that the first digital card contains the second digital card.

Example 19 is the computer implemented method of any or all previous examples wherein the computer executable instructions further comprise computer executable instructions which, when executed by the at least one processor, cause the at least one processor to perform steps further comprising:
detecting an activity performed relative to the digital card; and
providing an activity indicator to a graph management system that generates a graph corresponding to the digital card indicative of the activity performed relative to the digital card.

Example 20 is a computer implemented method, comprising:
exposing, at a data pod accessing system, an interface to access a set of digital cards of a plurality of digital cards stored on a de-centralized data storage system architecture, each of the plurality of digital cards being stored in a data pod comprising a plurality of digital cards in a given data storage system of a plurality of data storage systems in a de-centralized data storage system architecture, and each digital card representing a different digital item and including metadata from the digital item, and;
receiving, through the interface, a digital card access request to access the set of digital cards;
obtaining access to the set of digital cards from the data pods in the de-centralized data storage system architecture; and
generating a digital card output at the data pod accessing system indicative of the set of digital cards.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computing system, comprising:
at least one processor; and
a data store storing computer executable instructions which, when executed by the at least one processor, cause the at least one processor to perform steps, comprising:
detecting, at a data pod accessing system, an input request to create a digital card representing a digital item;
obtaining digital item metadata corresponding to the digital item;
generating the digital card including the digital item metadata;
generating a card output to store the digital card in a data pod, comprising a plurality of digital cards in a given data storage system of a plurality of data storage systems in a de-centralized data storage system architecture; and exposing, at the data pod accessing system, an interface configured to access the plurality of data storage systems in the de-centralized data storage system architecture;
receiving, through the interface, a digital card access request;
based on the digital card access request,
obtaining a first representation of a first digital card from a first data storage system in the plurality of data storage systems in the de-centralized data storage system architecture, and
obtaining a second representation of a second digital card from a second data storage system in the plurality of data storage systems in the de-centralized data storage system architecture;
aggregating the first digital card and the second digital card based on an aggregation criterion to obtain an aggregated set of digital cards; and
generating a digital card output at the data pod accessing system indicative of the aggregated set of digital cards.

2. The computing system of claim 1, further comprising:
generating a data store request at the data pod accessing system based on the digital card access request;
sending the data store request to at least one data storage system of the first data storage system or the second data storage system, the data store request including access control information for the at least one data storage system to perform access control relative to the first digital card.

3. The computing system of claim 1 wherein aggregating the first digital card and the second digital card comprises:
loading the first and second representations into memory at the data pod accessing system;
joining the first and second representations to obtain a joined set of representations; and
outputting the joined set of representations.

4. The computing system of claim 3 wherein the computer executable instructions further comprise computer executable instructions which, when executed by the at least one processor, cause the at least one processor to perform steps further comprising:
detecting a relationship input indicative of creating a relationship between the first digital card and the second digital card; and
modifying at least one of the first digital card and the second digital card to indicate the relationship.

5. The computing system of claim 4 wherein detecting a relationship input comprises detecting the relationship input indicating that the first digital card contains the second digital card and wherein modifying at least one of the first digital card and the second digital card comprises:
modifying the first digital card to indicate that the first digital card contains the second digital card.

6. The computing system of claim 4 wherein the computer executable instructions further comprise computer executable instructions which, when executed by the at least one processor, cause the at least one processor to perform steps further comprising:
providing a relationship indicator to a graph management system that generates a graph corresponding to the first digital card indicative of the relationship between the first digital card and the second digital card.

7. The computing system of claim 1 wherein the plurality of data storage systems, in the de-centralized data storage system architecture store a plurality of data pods and wherein each data pod in the plurality of data pods stores a set of homogenous digital cards representing a set of heterogeneous digital items.

8. The computing system of claim 7 wherein exposing an interface comprises:
exposing the interface to access the set of homogenous digital cards representing the set of heterogeneous digital items.

9. The computing system of claim 1 wherein the computer executable instructions further comprise computer executable instructions which, when executed by the at least one processor, cause the at least one processor to perform steps further comprising:
detecting an activity performed relative to the digital card; and
providing an activity indicator to a graph management system that generates a graph corresponding to the digital card indicative of the activity performed relative to the digital card.

10. A computer implemented method, comprising:
detecting, at a data pod accessing system, an input request to create a digital card representing a digital item;
obtaining digital item metadata corresponding to the digital item;
generating the digital card including the digital item metadata;
generating a card output to store the digital card in a data pod, comprising a plurality of digital cards in a given data storage system of a plurality of data storage systems in a de-centralized data storage system architecture;
exposing, at the data pod accessing system, an interface configured to access the plurality of data storage systems in the de-centralized data storage system architecture;
receiving, through the interface, a digital card access request;
obtaining access to a set of digital cards, that are distributed across the plurality of data storage systems in the de-centralized data storage system architecture, through the data pod accessing system, wherein obtaining access comprises:
receiving a first representation of a first digital card from a first data storage system in the plurality of data storage systems; and
receiving a second representation of a second digital card from a second data storage system in the plurality of data storage systems; and
generating a digital card output at the data pod accessing system indicative of the set of digital cards by outputting the first and second representations as if the first digital card and the second digital card are stored in a single logical location.

11. The computer implemented method of claim 10 and further comprising:
Aggregating the set of digital cards, that are distributed across the plurality of data storage systems in the de-centralized data storage system architecture, based on an aggregation criterion to obtain an aggregated set of digital cards.

12. The computer implemented method of claim 10 wherein obtaining access to the set of digital cards comprises:
generating a data store request at the data pod accessing system based on the digital card access request;
sending the data store request to at least one of the plurality of data storage systems in the de-centralized data storage system architecture, the data store request including access control information for the at least one of the plurality of data storage systems to perform access control relative to the set of digital cards; and receiving a representation of the set of digital cards from the at least one of the plurality of data storage systems in the de-centralized data storage system architecture based on the data store request.

13. The computer implemented method of claim 10 wherein generating a digital card output comprises:

loading the first and second representations into memory at the data pod accessing system;

joining the first and second representations to obtain a joined set of representations; and outputting the joined set of representations.

14. The computer implemented method of claim 13 further comprising:

detecting a relationship input indicative of creating a relationship between the first digital card and the second digital card; and modifying at least one of the first digital card and the second digital card to indicate the relationship.

15. The computer implemented method of claim 14 wherein detecting a relationship input comprises detecting the relationship input indicating that the first digital card contains the second digital card and wherein modifying at least one of the first digital card and the second digital card comprises:

modifying the first digital card to indicate that the first digital card contains the second digital card.

16. The computer implemented method of claim 10 further comprising:

detecting an activity performed relative to the digital card; and providing an activity indicator to a graph management system that generates a graph corresponding to the digital card indicative of the activity performed relative to the digital card.

17. A computer implemented method, comprising:

exposing, at a data pod accessing system, an interface to access a set of digital cards of a plurality of digital cards stored on a de-centralized data storage system architecture, each of the plurality of digital cards being stored in a data pod comprising a plurality of digital cards in a given data storage system of a plurality of data storage systems in a de-centralized data storage system architecture, and each respective digital card of the plurality of digital cards representing a different digital item and including metadata from the respective digital item, and;

receiving, through the interface, a digital card access request to access the set of digital cards;

obtaining access to the set of digital cards from the data pods in the de-centralized data storage system architecture, wherein obtaining access comprises;

receiving a first representation of a first digital card from a first data storage system in the plurality of data storage systems, and receiving a second representation of a second digital card from a second data storage system in the plurality of data storage systems; and generating a digital card output at the data pod accessing system indicative of the set of digital cards, wherein generating a digital card output comprises;

loading the first and second representation into memory at the data pod accessing system;

joining the first and second representations to obtain a joined set of representations; and outputting the joined set of representations.

* * * * *